(12) United States Patent
Kikura et al.

(10) Patent No.: US 8,814,741 B2
(45) Date of Patent: Aug. 26, 2014

(54) DRIVE DEVICE FOR VEHICLE

(75) Inventors: Takaharu Kikura, Tokyo (JP); Yoshinobu Yamazaki, Tokyo (JP); Yusuke Kakihara, Tokyo (JP); Kensuke Kaneda, Tokyo (JP); Susumu Ito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 268 days.

(21) Appl. No.: 13/363,269

(22) Filed: Jan. 31, 2012

(65) Prior Publication Data

US 2012/0202648 A1    Aug. 9, 2012

(30) Foreign Application Priority Data

| Feb. 4, 2011 | (JP) | 2011-022686 |
|---|---|---|
| Feb. 18, 2011 | (JP) | 2011-033400 |
| Mar. 24, 2011 | (JP) | 2011-065752 |
| Mar. 30, 2011 | (JP) | 2011-076197 |
| May 26, 2011 | (JP) | 2011-117641 |

(51) Int. Cl.
    *F16H 37/02*      (2006.01)

(52) U.S. Cl.
    USPC ............................................ 475/210; 701/67

(58) Field of Classification Search
    USPC .................... 475/207, 210; 701/67
    See application file for complete search history.

(56) References Cited

U.S. PATENT DOCUMENTS

| 6,019,695 | A  | * |  2/2000 | Kobayashi | 475/204 |
| 6,217,479 | B1 | * |  4/2001 | Brown et al. | 477/166 |
| 7,575,111 | B2 | * |  8/2009 | Ogata et al. | 475/210 |
| 8,267,830 | B2 | * |  9/2012 | Brown | 475/210 |
| 8,303,459 | B2 | * | 11/2012 | Kawai | 475/320 |
| 2010/0323839 | A1 | * | 12/2010 | Kawai | 475/210 |

FOREIGN PATENT DOCUMENTS

JP      2006-009973 A      1/2006

\* cited by examiner

*Primary Examiner* — Derek D Knight
(74) *Attorney, Agent, or Firm* — McGinn IP Law Group, PLLC

(57) ABSTRACT

There is provided a drive device for a vehicle. A forward clutch that is engaged during forward driving is provided in a power transmission path between an engine and a drive wheel. A spring is incorporated in an engagement oil chamber of the forward clutch, thereby causing the forward clutch to be held in a slipping state or an engaged state through the spring force even during an idling stop that suffers from reduced control oil pressure. This arrangement can prevent the forward clutch from producing an engagement shock during an engine restart. In addition, an input clutch driven by an electric actuator is provided in the power transmission path. With this arrangement, neutral control can be performed by disengaging the input clutch even if the forward clutch which is to be held in a slipping state or an engaged state is provided.

25 Claims, 23 Drawing Sheets

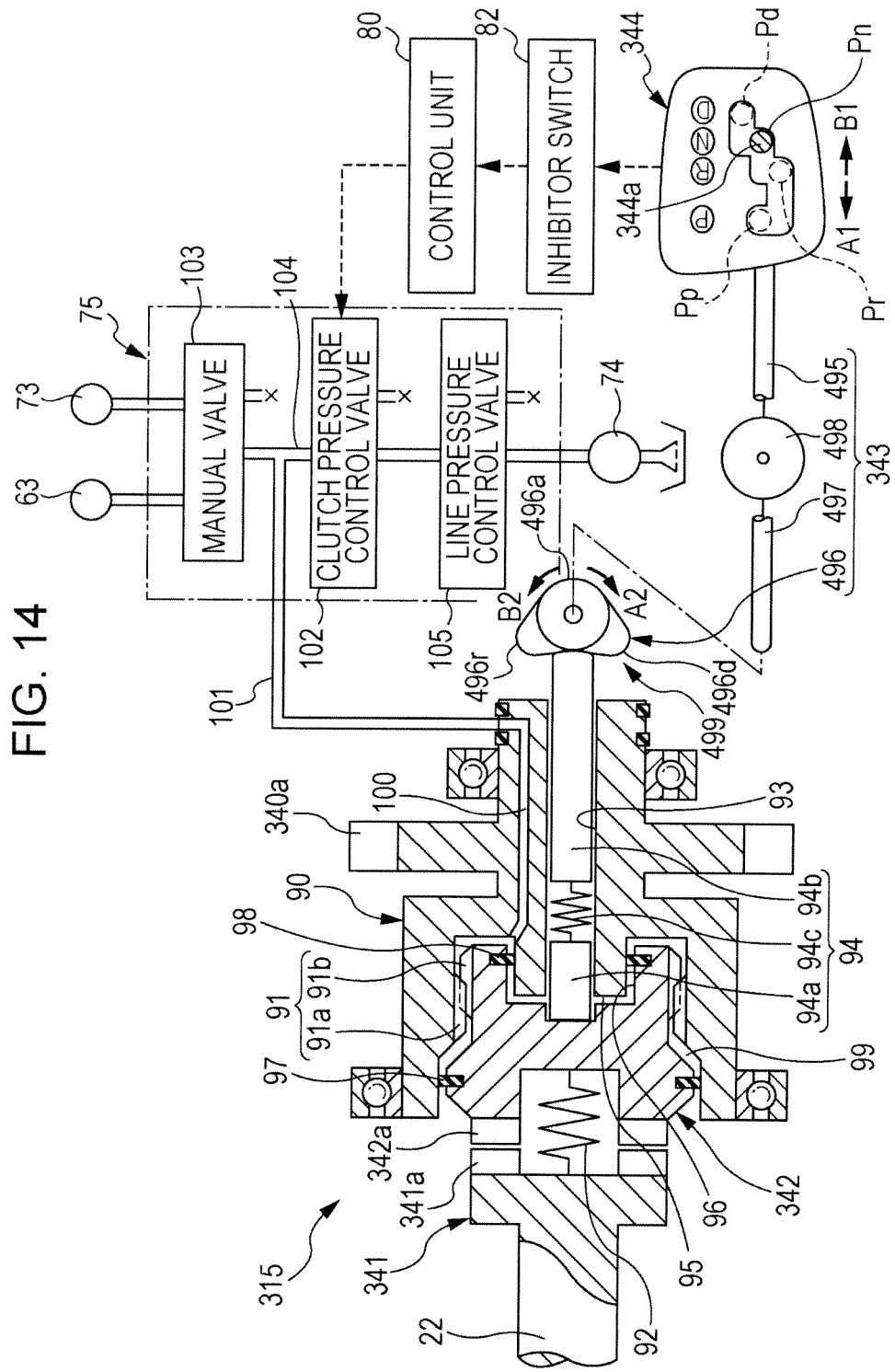

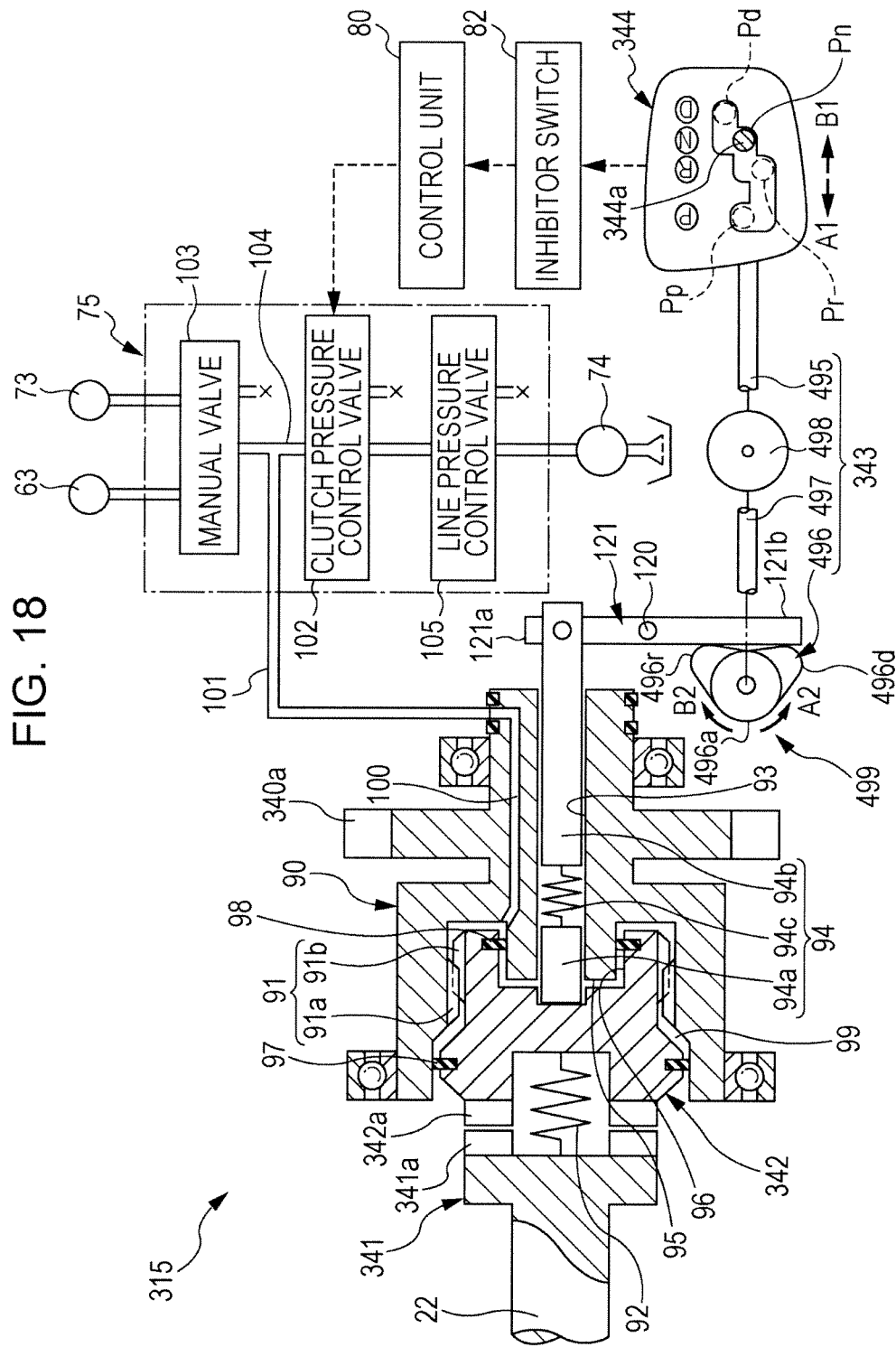

DRIVE DEVICE FOR VEHICLE

CROSS-REFERENCES TO RELATED APPLICATIONS

The present application claims priority from Japanese Patent Application Nos. 2011-022686 filed on Feb. 4, 2011, 2011-033400 filed on Feb. 18, 2011, 2011-065752 filed on Mar. 24, 2011, 2011-076197 filed on Mar. 30, 2011, and 2011-117641 filed on May 26, 2011, the entire contents of which are hereby incorporated by reference.

BACKGROUND OF THE INVENTION

1. Field of the Invention

The present invention relates to a drive device for a vehicle provided with an engine that is automatically shut down under a predetermined shutdown condition and is automatically restarted under a predetermined restart condition.

2. Description of the Related Art

Idling stop vehicles that automatically shut down the engine when they come to a stop have recently been developed in order to reduce the amount of fuel that the engine consumes. These idling stop vehicles are configured to automatically shut down the engine when a predetermined shutdown condition is met, while they are configured to automatically restart the engine when a predetermined restart condition is met. Also, hybrid vehicles equipped with an engine and an electric motor are usually configured to automatically shut down the engine when they come to a stop.

Automatic transmissions provided with a plurality of hydraulic clutches and hydraulic brakes (hereinafter referred to as hydraulic clutches, including hydraulic brakes) are mounted in vehicle power trains. In order to deliver clutch control oil pressure to the automatic transmission, an engine-driven oil pump is connected to the automatic transmission. However, in vehicles equipped with an idling stop feature, the engine and the oil pump are shut down when the vehicle comes to a stop, causing the hydraulic clutch in an engaged state to become disengaged without keeping the engaged state. When the oil pump begins to operate again after the engine is restarted, the disengaged hydraulic clutch becomes engaged, whereby the hydraulic clutch produces an engagement shock.

In order to avoid the disengagement of the hydraulic clutch during an idling stop mode, an electric oil pump or accumulator may be used to prevent oil pressure from dropping during an engine shutdown. The installation of the electric oil pump, however, causes an increase in cost of vehicles equipped with an idling stop feature. Thus, a power transmission device having a spring incorporated in the piston of the hydraulic clutch has been developed to ensure that the hydraulic clutch is not completely disengaged even if the hydraulic clutch suffers from a reduced control oil pressure (for example, Japanese Unexamined Patent Application Publication No. 2006-9973).

As described above, even if the oil pump is shut down, the hydraulic clutch can be prevented from being completely disengaged by biasing the hydraulic clutch piston in an engagement direction with a spring. Doing this prevents the hydraulic clutch from producing an engagement shock at the time of an engine restart.

However, the vehicle transmission device disclosed in Japanese Unexamined Patent Application Publication No. 2006-9973 is configured to have a hydraulic clutch piston urged toward the engagement direction with a spring. Due to this configuration, the hydraulic clutch has a cancellation oil chamber that supplies hydraulic oil for its disengagement. In other words, in order to completely disengage the hydraulic clutch, hydraulic oil must be delivered to the cancellation oil chamber. For this reason, during an engine shutdown that causes the oil pump to be deactivated, hydraulic oil cannot be delivered to the cancellation oil chamber of the hydraulic clutch. As a result, the hydraulic clutch is held in a slipping or engaged state, whereby the vehicle cannot be switched to a neutral state.

SUMMARY OF THE INVENTION

Accordingly, it is an object of the present invention to provide a drive device for a vehicle that can prevent the occurrence of an engagement shock during an engine restart and can switch the vehicle to a neutral state even during an engine shutdown.

An of the present invention provides a drive device for a vehicle provided with an engine that is automatically shut down under a predetermined shutdown condition and is automatically restarted under a predetermined restart condition, the drive device for a vehicle including: a friction engagement mechanism that is provided in a power transmission path between the engine and a drive wheel and moves a hydraulic piston to an engagement direction to bring a friction plate into an engaged state and moves the hydraulic piston to an disengagement direction to cancel the engaged state of the friction plate; an oil pump that is driven by the engine and delivers hydraulic oil to the friction engagement mechanism for moving the hydraulic piston to the engagement direction or the disengagement direction; and an input clutch that is provided in the power transmission path and is switched to a disengaged state that disconnects the power transmission path or to an engaged state that connects the power transmission path on the basis of an shift operation by a driver. The friction engagement mechanism is provided with a biasing unit for biasing the hydraulic piston toward the engagement direction to maintain the friction engagement mechanism in a slipping state or an engaged state during an engine shutdown that causes the oil pump to be deactivated. The input clutch is switched to a disengaged state when a neutral position is selected, thereby disconnecting the engine from the drive wheel even during the engine shutdown which causes the friction engagement mechanism to be put into the slipping state or engaged state.

Preferably, the input clutch is a dog clutch.

Preferably, an input clutch mechanism is provided that is disposed in the power transmission path, has an electromagnetic drive. The input clutch mechanism is switched to an engaged state in which the power transmission path is connected when the electromagnetic drive is energized and is switched to a disengaged state in which the power transmission path is disconnected when the electromagnetic drive is de-energized. It is also preferable that an input clutch control unit is provided that puts the electromagnetic drive into an energization state or a non-energization state on the basis of the shift operation of the driver. If the neutral position is selected when the vehicle is in an activation state in which an activation switch is activated, the input clutch control unit puts the electromagnetic drive to a de-energization state, thereby switching the input clutch mechanism to the disengaged state. If the vehicle is in a deactivation state in which the activation switch is deactivated, the deactivation of the activation switch causes the electromagnetic drive to be put into the de-energization state, thereby switching the input clutch mechanism to the disengaged state.

Preferably, a manual shift control is provided that is shifted to a drive range when power is transmitted to a drive wheel and is shifted to a non-drive range when transmission of power to the drive wheel is cancelled. The dog clutch is connected to the manual shift control, and the engine and the drive wheel are separated from each other when the non-drive range is selected by the driver during the engine shutdown which causes the friction engagement mechanism to be put into the slipping state or the engaged state.

Preferably, the dog clutch has a drive mating member and a driven mating member that faces the drive mating member, and a rod member that pushes the driven mating member into the drive mating member in conjunction with the manual shift control. The rod member has a distal end member and a proximal end member that is disposed coaxially with the distal end member with a buffering member therebetween.

Preferably, the rod member is pushed into a position at which the rod member comes into contact with the driven mating member when a forward drive range that is one type of the drive range is selected.

Preferably, the dog clutch has the drive mating member and the driven mating member which faces the drive mating member, and an engagement oil chamber that urges the driven mating member toward the drive mating member is defined at a back side of the driven mating member.

Preferably, hydraulic oil is delivered to the engagement oil chamber when a rearward drive range that is one type of the drive range is selected.

Preferably, hydraulic oil is delivered to the engagement oil chamber when a forward drive range that is one type of the drive range is selected.

Preferably, the dog clutch has a drum member that is connected to a peripheral portion of the driven mating member with a spline connection therebetween, and a pair of oil seals is provided at one end and the other end of the spline connection between the driven mating member and the drum member. The engagement oil chamber is defined by the oil seals between the driven mating member and the drum member.

Preferably, a cam mechanism is provided that is disposed between the manual shift control and the dog clutch and switches the dog clutch to the disengaged state when the manual shift control is shifted to the non-drive range and switches the dog clutch to the engaged state when the manual shift control is shifted to the drive range.

Preferably, the cam mechanism has a cam that is rotated in conjunction with the manual shift control, and the cam has a plurality of projections on a profile of the cam.

Preferably, the dog clutch has the drive mating member and the driven mating member which faces the drive mating member, and has the rod member that pushes the driven mating member into the drive mating member, and the rod member is pushed by one of the projections when the manual shift control is shifted to the forward drive range which is one type of the drive range and the rod member is pushed by another of the projections when the manual shift control is shifted to the rearward drive range which is one type of the drive range.

Preferably, the rod member has a distal end member and a proximal end member that is disposed coaxially with the distal end member with a buffering member therebetween.

Preferably, the dog clutch has the drive mating member and the driven mating member which faces the drive mating member, and the engagement oil chamber which urges the driven mating member toward the drive mating member is defined at a back side of the driven mating member.

Preferably, hydraulic oil is delivered to the engagement oil chamber when the manual shift control is shifted to the forward drive range or the rearward drive range which are types of the drive range.

Preferably, the dog clutch has a drum member that is connected to a peripheral portion of the driven mating member with a spline connection therebetween, and a pair of oil seals is provided at one end and the other end of the spline connection between the driven mating member and the drum member, and the engagement oil chamber is defined by the oil seals between the driven mating member and the drum member.

Preferably, an actuator is provided that is connected to the cam mechanism. Switching of the dog clutch to an engaged state is assisted by the power of the actuator.

Preferably, an electric actuator is provided that is connected to the dog clutch and switches the dog clutch to the disengaged state when the manual shift control is shifted to the non-drive range and switches the dog clutch to an engaged state when the manual shift control is shifted to the drive range.

Preferably, the dog clutch has a drive mating member and a driven mating member that faces the drive mating member, and has a rod member that is connected to the electric actuator and pushes the driven mating member into the drive mating member, and the rod member has a distal end member and a proximal end member that is disposed coaxially with the distal end member with a buffering member therebetween.

Preferably, the electric actuator pushes the rod member into a position at which the rod member comes into contact with the driven mating member when the drive range is selected.

Preferably, the electric actuator switches the dog clutch to the disengaged state when not energized.

Preferably, the dog clutch has the drive mating member and the driven mating member which faces the drive mating member, and an engagement oil chamber that urges the driven mating member toward the drive mating member is defined at a back side of the driven mating member.

Preferably, hydraulic oil is delivered to the engagement oil chamber when the drive range is selected.

Preferably, the dog clutch has a drum member that is connected to a peripheral portion of the driven mating member with a spline connection therebetween, and a pair of oil seals is provided at one end and the other end of the spline connection between the driven mating member and the drum member, and the engagement oil chamber is defined by the oil seals between the driven mating member and the drum member.

BRIEF DESCRIPTION OF THE DRAWINGS

FIG. 14 is a schematic view showing a structure and control system of a dog clutch of a drive device for a vehicle according to a fourth embodiment of the present invention.

FIG. 18 is a schematic view showing a structure and control system of a dog clutch provided in a drive device for a vehicle according to a modification of the second embodiment.

DESCRIPTION OF THE PREFERRED EMBODIMENTS

A first embodiment of the present invention is described below with reference to FIGS. 1 through 5.

Figure 1:
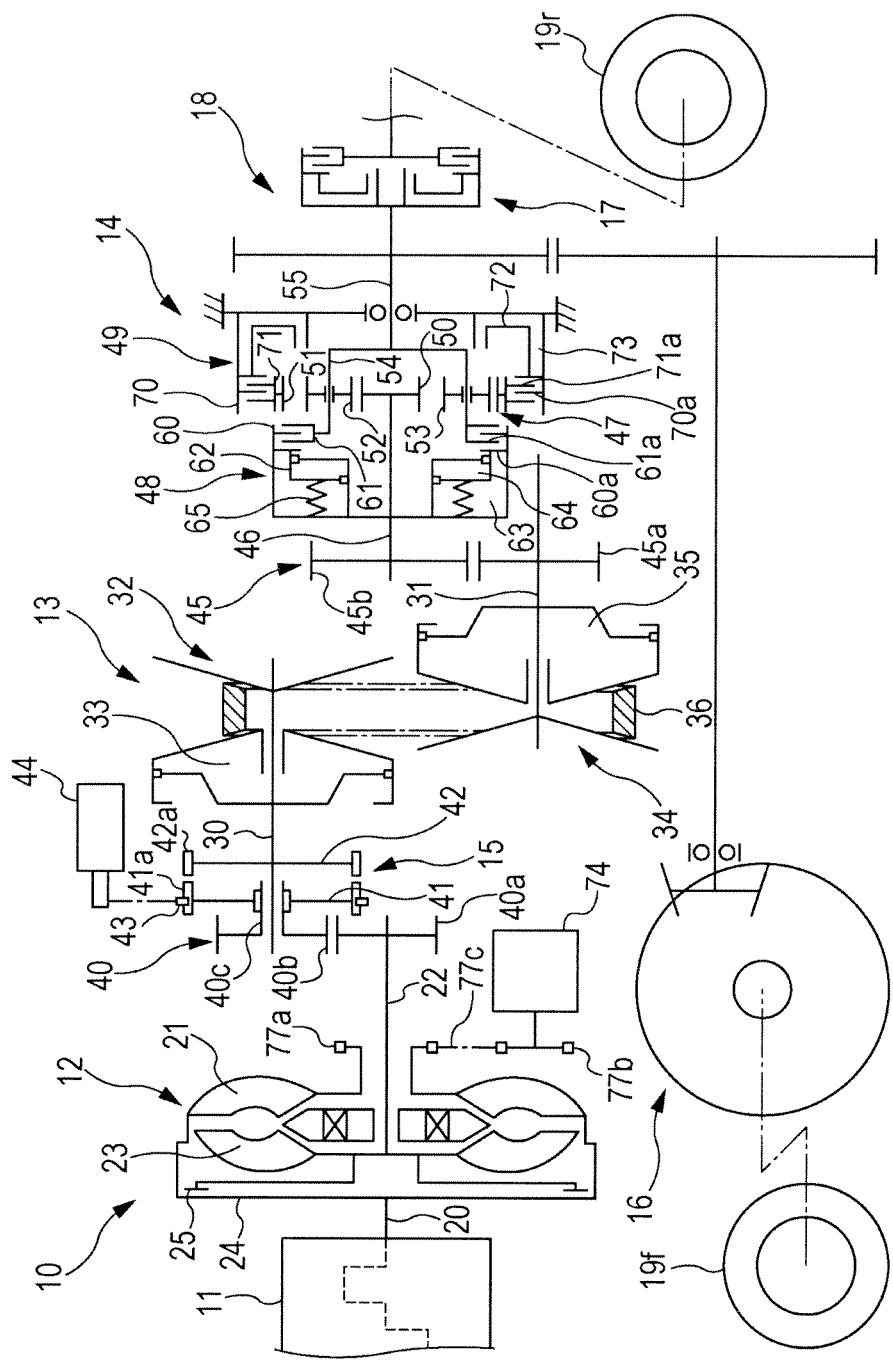
FIG. 1 is a schematic view showing a drive device for a vehicle according to a first embodiment of the present invention.

FIG. 1 is a schematic view showing a drive device for a vehicle according to the first embodiment of the present invention. As shown in FIG. 1, a drive device for a vehicle 10 has an engine 11, a torque converter 12, a continuously variable transmission (gearshift mechanism) 13, and a forward/backward switching mechanism 14. The engine 11 is connected to the continuously variable transmission 13 via the torque converter 12 and an input clutch 15, while the continuously variable transmission 13 is connected to a front wheel (drive wheel) 19f via the forward/backward switching mechanism 14 and a front differential mechanism 16. The forward/backward switching mechanism 14 is connected to a rear wheel (drive wheel) 19r via a transfer clutch 17. In other words, the input clutch 15 and the forward/backward switching mechanism 14 are provided in a power transmission path 18 between the engine 11 and the drive wheels 19f and 19r, in which power is transmitted from the engine 11 to the drive wheels 19f and 19r through the input clutch 15 and the forward/backward switching mechanism 14.

The drive device for a vehicle 10 shown in the figures has an idling stop function which automatically shuts down the engine 11 when a predetermined shutdown condition is met and automatically restarts the engine 11 when a predetermined restart condition is met. Examples of the shutdown condition for the engine 11 include that a vehicle is in a stationary state (vehicle speed=0 km/h), that a brake pedal is depressed, and the like. Examples of the restart conditions for the engine 11 include that the brake pedal is released, that an accelerator pedal is depressed, and the like. A starter motor for starting the engine 11 may be one whose pinion projects so as to be engaged with a ring gear (not illustrated) of the engine 11 during engine startup, or may be one whose pinion is constantly meshed with the ring gear via a one-way clutch. Also, an alternator may be used as a starter motor.

The torque converter 12 connected to the engine 11 has a pump impeller 21 that is connected to a crankshaft 20 and a turbine liner 23 that faces the pump impeller 21 and is connected to a turbine shaft 22. The torque converter 12 is provided with a lock-up clutch 25 that directly connects a front cover 24 and the turbine liner 23. The continuously variable transmission 13 has a primary shaft 30 and a secondary shaft 31 that is disposed so as to be parallel to the primary shaft 30. The primary shaft 30 is provided with a primary pulley 32 that has a primary oil chamber 33 defined at a back side thereof. Also, the secondary shaft 31 is provided with a secondary pulley 34 that has a secondary oil chamber 35 defined at a back side thereof. Furthermore, a drive chain 36 is wrapped around the primary pulley 32 and the secondary pulley 34. The groove width of the pulleys can be changed by adjusting the oil pressure of the primary oil chamber 33 and the secondary oil chamber 35, whereby the diameter of the drive chain 36 can be changed. As a result, the gear ratio of the secondary shaft 31 to the primary shaft 30 can be changed continuously and variably.

A gear train 40 and the input clutch 15 are provided between the torque converter 12 and the continuously variable transmission 13 in order to transmit engine power from the torque converter 12 to the continuously variable transmission 13. The gear train 40 is provided with a drive gear 40a fixed to the turbine shaft 22 of the torque converter 12 and a driven gear 40b rotatably mounted on the secondary shaft 31. The input clutch 15 which is a dog clutch is provided with a drive disk 41 axially movably mounted on a hollow shaft 40c of the driven gear 40b and a driven disk 42 fixed to the primary shaft 30. The drive disk 41 has a concave-convex portion 41a formed in a peripheral portion thereof, and the driven disk 42 has also a concave-convex portion 42a formed in the peripheral portion thereof, the concave-convex portions 41a and 42a facing each other. In addition, an electric actuator 44 is connected to the drive disk 41 via a fork member 43. The drive disk 41 can be axially slid by the electric actuator 44. Moving the drive disk 41 toward the driven disk 42 allows the concave-convex portion 41a of the drive disk 41 to be engaged with the concave-convex portion 42a of the driven disk 42, causing the input clutch 15 to be switched to an engaged state in which the power transmission path 18 is in a connected state. In contrast, moving the drive disk 41 away from the driven disk 42 allows the concave-convex portion 41a of the drive disk 41 to be disengaged from the concave-convex portion 42a of the driven disk 42, causing the input clutch 15 to be switched to a disengaged state in which the power transmission path 18 is in a disconnected state.

The forward/backward switching mechanism 14 is connected to the secondary shaft 31 through a gear train 45 to cause engine power to be output from the continuously variable transmission 13 to the drive wheels 19f and 19r. The gear train 45 is provided with a drive gear 45a fixed to the secondary shaft 31 and a driven gear 45b fixed to a forward/backward input shaft 46 of the forward/backward switching mechanism 14. In addition, the forward/backward switching mechanism 14 includes a double-pinion type planetary gear train 47, a forward clutch 48, and a rearward brake 49. The planetary gear train 47 of the forward/backward switching mechanism 14 is provided with a sun gear 50 fixed to the forward/backward input shaft 46 and a ring gear 51 mounted axially outward so as to be rotatable. A plurality of pairs of planetary pinion gears 52 and 53 engaged with each other are provided between the sun gear 50 and the ring gear 51. The planetary pinion gears 52 and 53 connecting the sun gear 50 and the ring gear 51 are rotatably supported by a carrier 54 that is fixed to a forward/backward output shaft 55.

The forward clutch (friction engagement mechanism) 48 of the forward/backward switching mechanism 14 is provided with a clutch drum 60 fixed to the forward/backward input shaft 46 and a clutch hub 61 fixed to the carrier 54. A plurality of friction plates 60a and 61a are provided between the clutch drum 60 and the clutch hub 61, in which the friction plate 60a is supported by an inner surface of the clutch drum 60 and the friction plate 61a is supported by a peripheral surface of the clutch hub 61. A hydraulic piston 62 for pressing the friction plates 60a and 61a is slidably provided inside the clutch drum 60. The hydraulic piston 62 housed in the clutch drum 60 has an engagement oil chamber 63 defined at one side thereof and has a disengagement oil chamber 64 defined at the other side thereof. In addition, the engagement oil chamber 63 has a spring (biasing unit) 65 incorporated therein. The hydraulic piston 62 is urged by the spring 65 in an engagement direction. The engagement direction is a direction in which the hydraulic piston 62 moves toward the friction plates 60a and 61a, while a disengagement direction to be described later is a direction in which the hydraulic piston 62 moves away from the friction plates 60a and 61a.

Delivering hydraulic oil to the engagement oil chamber 63 of the forward clutch 48 and discharging hydraulic oil from the disengagement oil chamber 64 allow the hydraulic piston 62 to be moved in the engagement direction, thereby enabling the hydraulic piston 62 to be pressed against the friction plates 60a and 61a which in turn become engaged with one another. This causes the forward clutch 48 to enter an engaged state in which the clutch drum 60 and the clutch hub 61 are rotated in an integral manner. In contrast, discharging hydraulic oil from the engagement oil chamber 63 and delivering hydraulic oil to the disengagement oil chamber 64 allow the hydraulic piston 62 to be moved in the disengagement direction, thereby enabling the hydraulic piston 62 to be moved away from the friction plates 60a and 61a which in turn become disengaged from one another. This causes the forward clutch 48 to enter a disengaged state in which the clutch drum 60 and the clutch hub 61 are disengaged from each other. Even if hydraulic oil is discharged from both of the engagement oil chamber 63 and the disengagement oil chamber 64, the hydraulic piston 62 is biased by the spring 65 in the engagement direction, causing the forward clutch 48 to be in a slipping state or an engaged state. The slipping state of the forward clutch 48 is a state in which there is no predetermined amount of play among the friction plates 60a and 61a, before the friction plates 60a and 61a are completely engaged with one another. In other words, the slipping state of the forward clutch 48 is a state in which the friction plates 60a and 61a are in slight contact with one another in the process of a transition of the forward clutch 48 from the disengaged state to the engaged state.

In addition, the rearward brake 49 of the forward/backward switching mechanism 14 has a brake drum 70 fixed to a casing (not illustrated) and a brake hub 71 fixed to the ring gear 51. A plurality of friction plates 70a and 71a are provided between the brake drum 70 and the brake hub 71, in which the friction plate 70a is supported by an inner surface of the brake drum 70 and the friction plate 71a is supported by a peripheral surface of the brake hub 71. A hydraulic piston 72 for pressing the friction plates 70a and 71a is slidably provided inside the brake drum 70. Furthermore, the hydraulic piston 72 has an engagement oil chamber 73 defined at one side thereof. Delivering hydraulic oil to the engagement oil chamber 73 allows the hydraulic piston 72 to be moved in the engagement direction, thereby allowing the rearward brake 49 to be switched to the engaged state. The hydraulic piston 72 of the rearward brake 49 has a return spring (not illustrated) incorporated therein. Discharging hydraulic oil from the engagement oil chamber 73 causes the rearward brake 49 to be switched to the disengaged state by a spring force.

During forward travelling, the forward clutch 48 becomes engaged with the rearward brake 49 being disengaged. This arrangement directly connects the forward/backward input shaft 46 and the forward/backward output shaft 55, causing the engine power input to the forward/backward input shaft 46 to be transmitted to the forward/backward output shaft 55 with the rotational direction of the forward/backward input shaft 46 remaining unchanged. In contrast, during rearward travelling, the rearward brake 49 becomes engaged with the forward clutch 48 being disengaged. This arrangement causes the ring gear 51 to be fixed, causing the engine power input to the forward/backward input shaft 46 to be transmitted to the forward/backward output shaft 55 with the rotational direction of the forward/backward input shaft 46 being changed to the opposite direction. As described above, the rotational direction of the forward/backward output shaft 55 can be changed by controlling the forward clutch 48 and the rearward brake 49 provided in the power transmission path 18.

Figure 2:
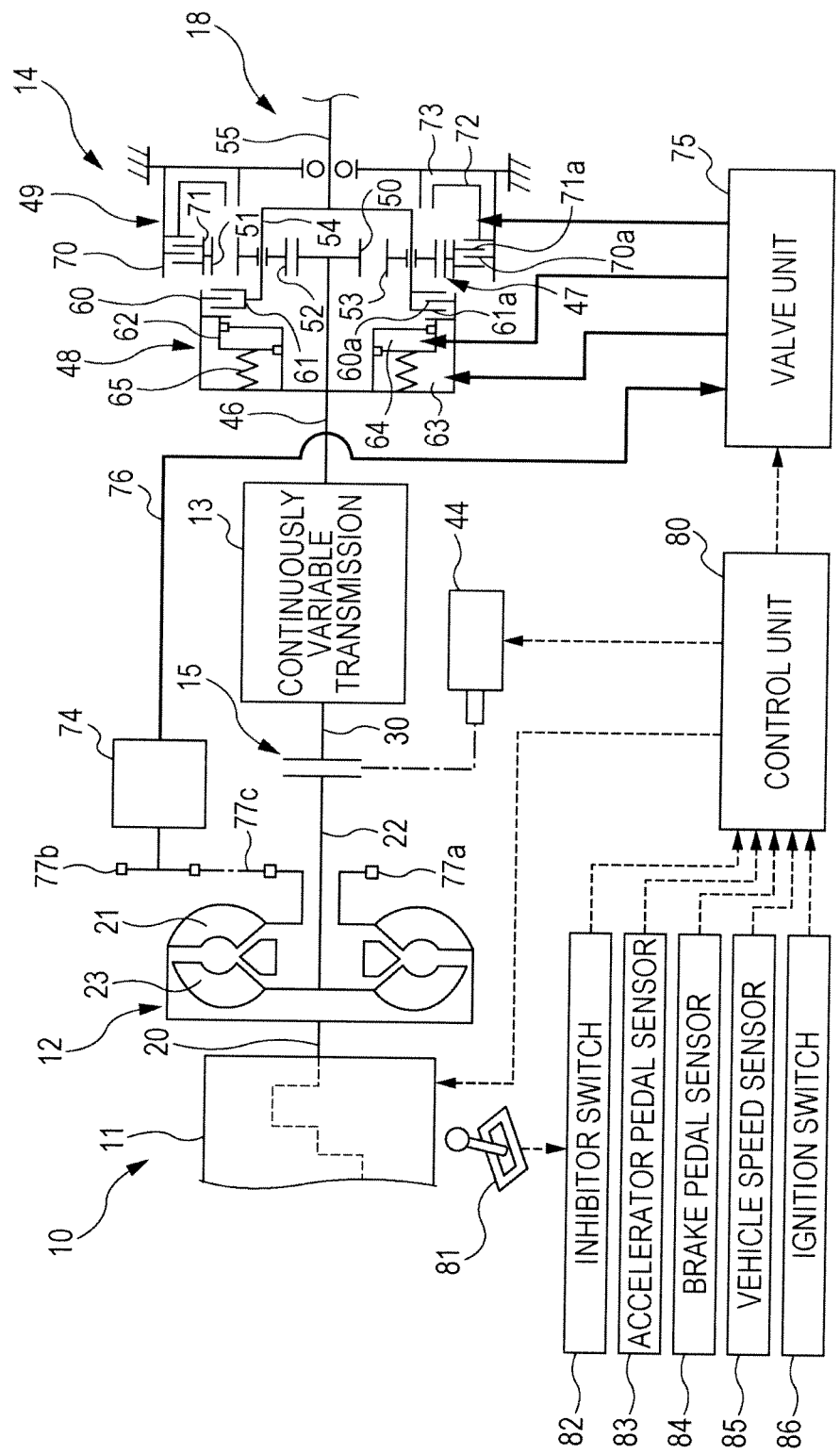
FIG. 2 is a schematic view showing part of the drive device for a vehicle together with a control system.

FIG. 2 is a schematic view showing part of the drive device for a vehicle 10 together with a control system. As shown in FIG. 2, the drive device for a vehicle 10 is provided with an oil pump 74, such as a trochoid pump, to deliver hydraulic oil to the forward/backward switching mechanism 14 or the like. The drive device for a vehicle 10 is also provided therein with a valve unit 75 having a plurality of solenoid valves to deliver hydraulic oil to the engagement oil chamber 63 and the disengagement oil chamber 64 of the forward clutch 48 and the engagement oil chamber 73 of the rearward brake 49. The oil pump 74 and the valve unit 75 are connected to each other via an oil passage 76. Hydraulic oil discharged from the oil pump 74 is delivered through the valve unit 75 to the forward clutch 48, the rearward brake 49 and the like. A driven sprocket 77b is coupled to the oil pump 74, while a drive sprocket 77a is coupled to the pump impeller 21 of the torque converter 12. The drive sprocket 77a and the driven sprocket 77b are connected to each other via a chain 77c. As described above, the engine 11 and the oil pump 74 are directly connected to each other, which causes the oil pump 74 to operate in conjunction with the engine 11. Needless to say, hydraulic oil discharged from the oil pump 74 is delivered through the valve unit 75 to the torque converter 12 and the continuously variable transmission 13.

Furthermore, the drive device for a vehicle 10 is provided with a control unit 80 for controlling the engine 11, the electric actuator 44, and the valve unit 75. The control unit 80 is connected with an inhibitor switch 82 for detecting an operating position (selection operation) of a select lever 81, an accelerator pedal sensor 83 for detecting an operation of an accelerator pedal, a brake pedal sensor 84 for detecting an operation of a brake pedal, a vehicle speed sensor 85 for detecting a vehicle speed, an ignition switch 86 operated by a driver, and the like. The control unit 80 makes a determination as to a vehicle status on the basis of information received from the sensors, and outputs a control signal to the engine 11, the valve unit 75, the electric actuator 44, and the like. The select lever 81 operated by the driver can be shifted to any one of the P (parking) range, the N (neutral) range, the D (forward driving) range, and the R (rearward driving) range. Also, the control unit 80 has a CPU for calculating the control signal, a ROM for storing a control program, an arithmetic expression, map data and the like, and a RAM for temporarily storing data.

Figure 3:
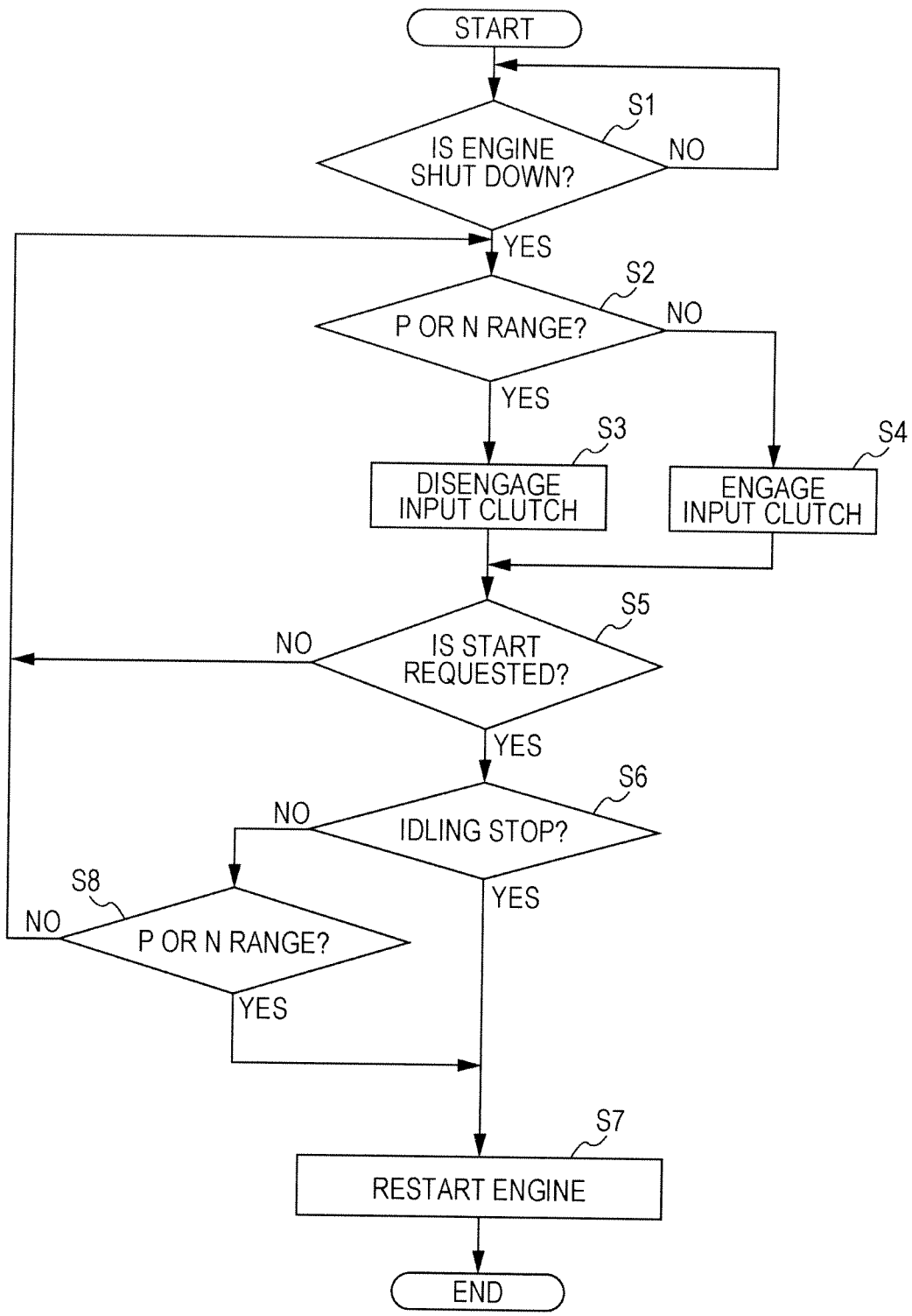
FIG. 3 is a flowchart for explaining input clutch switching control steps that are performed during engine shutdown.

Next, the switching control for the input clutch 15 is described below. FIG. 3 is a flowchart for explaining switching control steps for the input clutch 15 during engine shutdown. As shown in FIG. 3, a determination is made in step S1 as to whether or not the engine 11 has been shut down. If it is determined in step S1 that the engine 11 has been shut down due to idling stop or as a result of deactivation of the ignition switch 86, the flow proceeds to step S2 where a determination is made as to the position of the select lever 81. If it is determined in step S2 that the select lever 81 is in the P range or the N range, the flow proceeds to step S3 where the electric actuator 44 is activated to cause the input clutch 15 to be switched to the disengaged state. On the other hand, if it is determined in step S2 that the select lever 81 is in the D range or the R range instead of the P range or the N range, the flow proceeds to step S4 where the electric actuator 44 is activated to cause the input clutch 15 to be switched to the engaged state. As described above, even when the engine is shut down and as a result the oil pump 74 is deactivated, the input clutch 15 becomes disengaged if the P range or the D range is selected, while the input clutch 15 becomes engaged if the D range or the R range is selected.

Next, the flow proceeds to step S5 where a determination is made as to whether or not there has been a start request for the engine 11. In other words, if an engine shutdown is triggered by an idling stop, a determination is made as to whether or not a predetermined condition has become met, while if an engine shutdown is triggered via an ignition switch operation (hereinafter referred to as ignition operation), a determination is made as to whether or not the ignition switch 86 has been turned on. If it is determined in step S5 that there is no start request, the flow returns to step S2 to repeat the routine. On the other hand, if it is determined in step S5 that there has been a start request, the flow proceeds to step S6 where a determination is made as to whether or not the vehicle is in the idling stop state. If it is determined that the vehicle is in the idling stop state, the flow proceeds to step S7 where the engine 11 is restarted so as to be ready for resumption of travelling. Since the forward clutch 48 has the spring 65 incorporated therein for pressing the hydraulic piston 62 in the engagement direction, it is possible to hold the forward clutch 48 in the slipping state or the engaged state even in the case where control oil pressure is reduced due to the engine shutdown, which can prevent the forward clutch 48 from producing an engagement shock at the time of the engine restart.

Meanwhile, if it is determined in step S6 that the engine has been restarted via the ignition operation, the flow proceeds to step S8 where a determination is made as to the position of the select lever 81. If it is determined in step S8 that the select lever 81 has been shifted to the P range or the N range, the flow proceeds to step S8 where the engine 11 is restarted, since the input clutch 15 has been switched to the disengaged state. On the other hand, if it is determined in step S8 that the select lever 81 has been shifted to the D range or the R range, the flow returns to step S2 to repeat the routine, since the input clutch 15 has been switched to the engaged state. As described above, since it is anticipated during an engine start triggered via the ignition operation that the continuously variable transmission 13 or the like has a significantly reduced oil pressure, the engine 11 is restarted under the condition where the input clutch 15 is disengaged with the object of preventing the drive chain 36 or the like from slipping.

Figure 4:
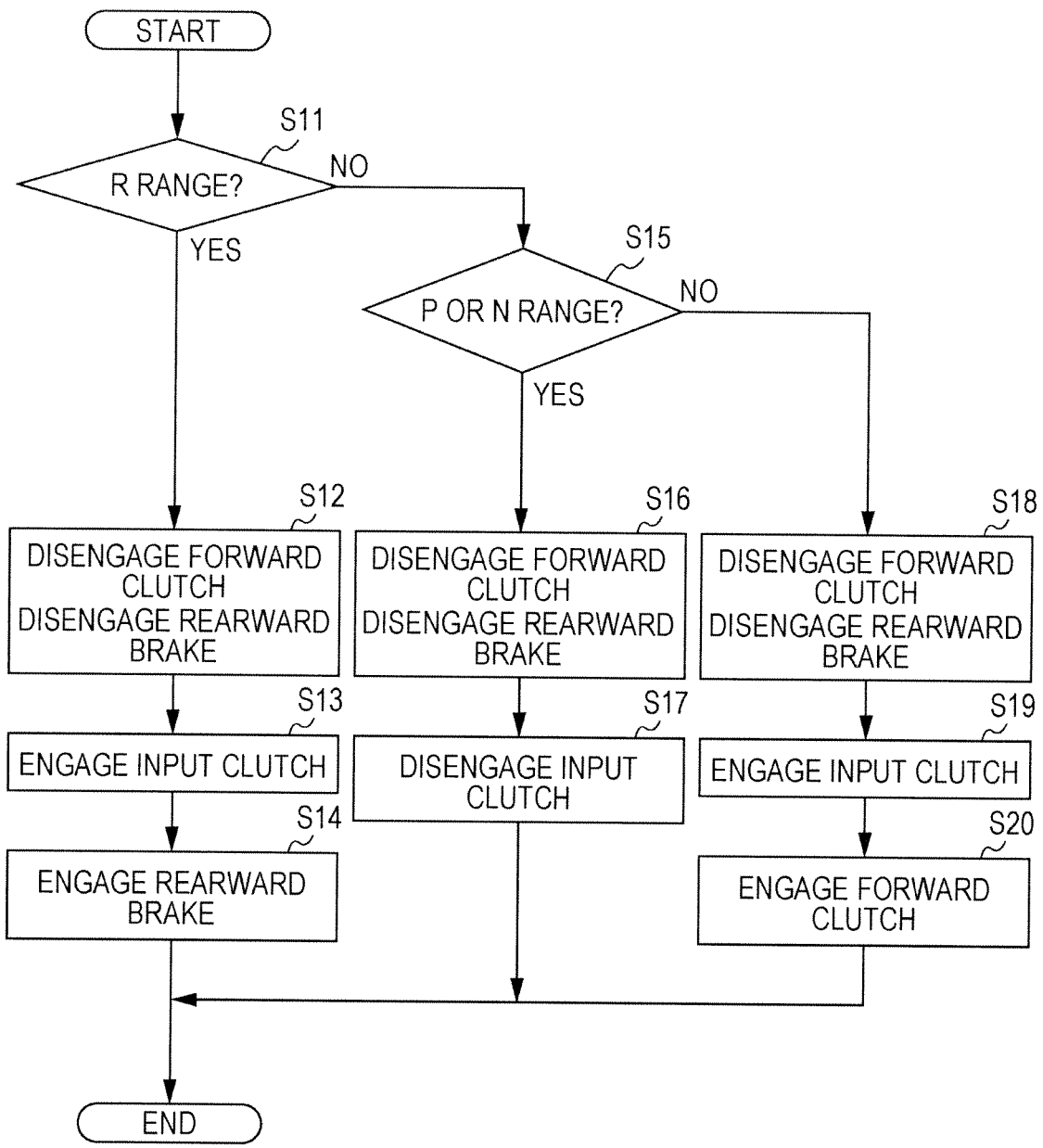
FIG. 4 is a flowchart for explaining input the clutch switching control steps which are performed during engine operation.

Next, the switching control for the input clutch 15 during the engine operation is described below. FIG. 4 is a flowchart for explaining switching control steps for the input clutch 15 when the engine is running. As shown in FIG. 4, a determination is made in step S11 as to whether or not the select lever 81 is shifted to the R range. If it is determined in step S11 that the select lever 81 is in the R range, the flow proceeds to step S12 to switch the input clutch 15 to the engaged state, where the forward clutch 48 and the rearward brake 49 are switched to the disengaged state. After the input clutch 15 is switched to the engaged state in step S13, the rearward brake 49 is switched to the engaged state in step S14. As described above, when the engine is running, the switching control of the input clutch 15 is configured to be performed after the forward clutch 48 and the rearward brake 49 have been disengaged, which allows the input clutch 15 to be smoothly switched to the engaged state, thereby enhancing vehicle quality while suppressing an engagement shock.

If it is determined in step S11 that the select lever 81 has not been shifted to the R range, the flow proceeds to step S15 where a determination is made as to whether or not the select lever 81 has been shifted to the P range or the N range. If it is determined in step S15 that the select lever 81 is in the P range or the N range, the flow proceeds to step S16 to switch the input clutch 15 to the disengaged state, where the forward clutch 48 and the rearward brake 49 are switched to the disengaged state. Then, the input clutch 15 is switched to the disengaged state in step S17. As described above, when the engine is running, the switching control of the input clutch 15 is configured to be performed after the forward clutch 48 and the rearward brake 49 have been disengaged, which allows the input clutch 15 to be smoothly switched to the disengaged state, thereby enhancing vehicle quality while suppressing an engagement shock.

If it is determined in step S15 that the select lever 81 has not been shifted to the P range or the N range, namely, if it is determined that the select lever 81 has been shifted to the D range, the flow proceeds to step S18 to switch the input clutch 15 to the engaged state, where the forward clutch 48 and the rearward brake 49 are switched to the disengaged state. After the input clutch 15 has been switched to the engaged state in step S19, the forward clutch 48 is switched to the engaged state in step S20. As described above, when the engine is running, the switching control of the input clutch 15 is configured to be performed after the forward clutch 48 and the rearward brake 49 are disengaged, which allows the input clutch 15 to be smoothly switched to the engaged state, thereby enhancing vehicle quality while suppressing an engagement shock.

As described above, the forward clutch 48 has the spring 65 incorporated therein for pressing the hydraulic piston 62 in the engagement direction, and thus it is possible to hold the forward clutch 48 in the slipping state or the engaged state even in the case where control oil pressure is reduced due to the engine shutdown, which can prevent the forward clutch 48 from producing an engagement shock at the time of an engine restart. In addition, since the input clutch 15 working with the shift operation is provided in the power transmission path 18, shifting the select lever 81 to the N range allows the input clutch 15 to be disengaged, thereby enabling the engine 11 to be disconnected from the drive wheels 19*f* and 19*r* even during the engine shutdown. In other words, since the forward clutch 48 is held in the slipping state or engaged state through a spring force, the forward clutch 48 cannot be disengaged during the engine shutdown at which no control oil pressure is available, and as a result the drive device for a vehicle 10 cannot be switched to the neutral state. To solve the problem, the drive device for a vehicle 10 according to the present embodiment is configured to provide the input clutch 15 to be disengaged via a shift operation in the power transmission path 18 between the engine 11 and the drive wheels 19*f* and 19*r*. This arrangement allows the drive device for a vehicle 10 to be switched to the neutral state through the disengagement of the input clutch 15 even if control oil pressure necessary for disengagement of the forward clutch 48 is not available, thereby enabling vehicle towing or other work to be safely done.

Figure 5:
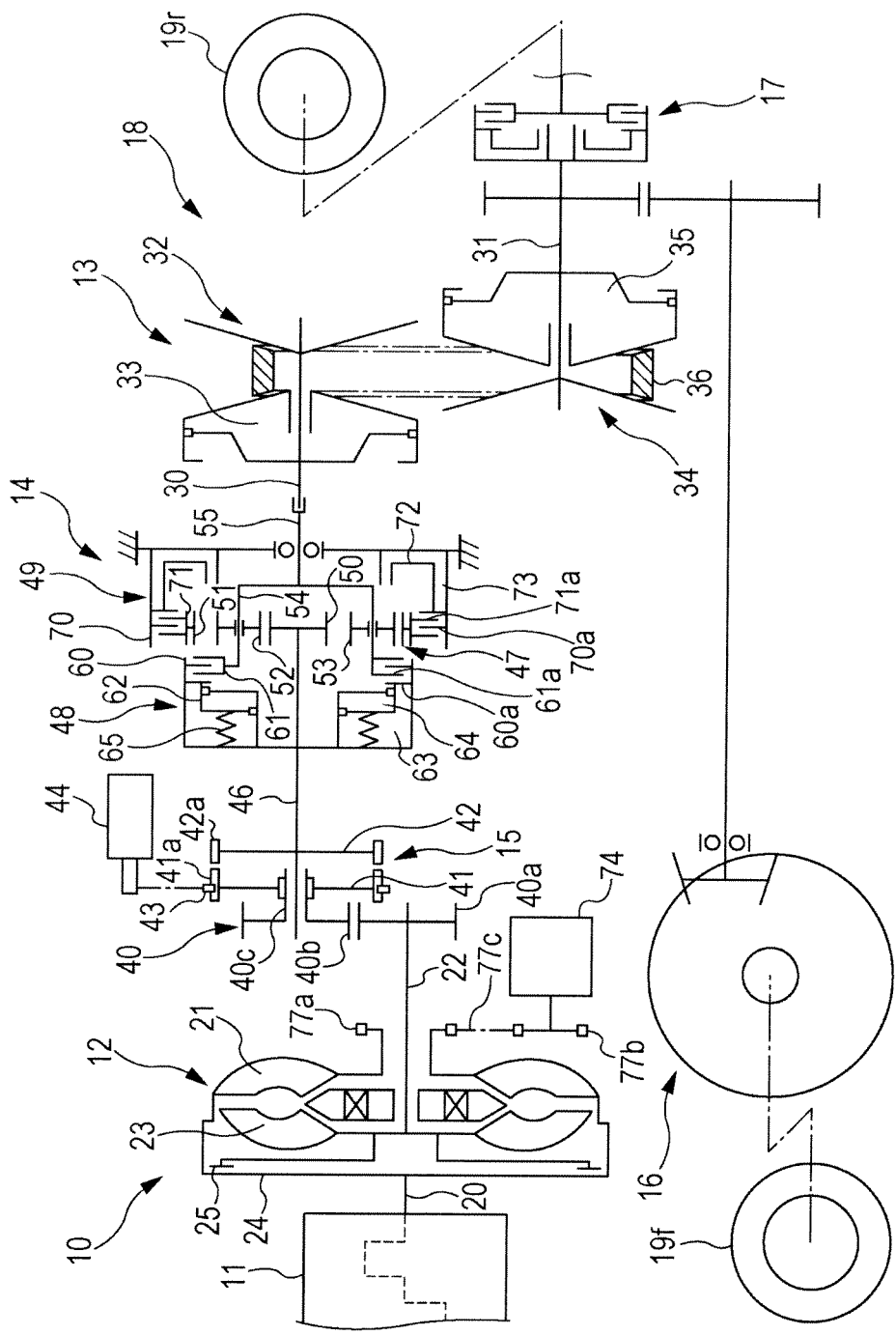
FIG. 5 is a schematic view showing a drive device for a vehicle according to a modification of the first embodiment.

In the above description, although the forward/backward switching mechanism 14 is disposed at the side of the drive wheels 19*f* and 19*r*, not at the side of the continuously variable transmission 13, its disposition is not limited to this. The forward/backward switching mechanism 14 may be disposed in other locations of the power transmission path 18. FIG. 5 is a schematic view showing a drive device for a vehicle according to a modification of the present embodiment. As shown in FIG. 5, the forward/backward switching mechanism 14 is disposed in the power transmission path 18 between the input clutch 15 and the primary pulley 32. Even when the forward/backward switching mechanism 14 is disposed at the side of the engine 11, not at the side of the continuously variable transmission 13, the present invention can be effectively applied since the forward clutch 48 and the input clutch 15 are disposed in the power transmission path 18.

Next, a second embodiment of the present invention is described below with reference to FIGS. 6 through 8.

Figure 6:
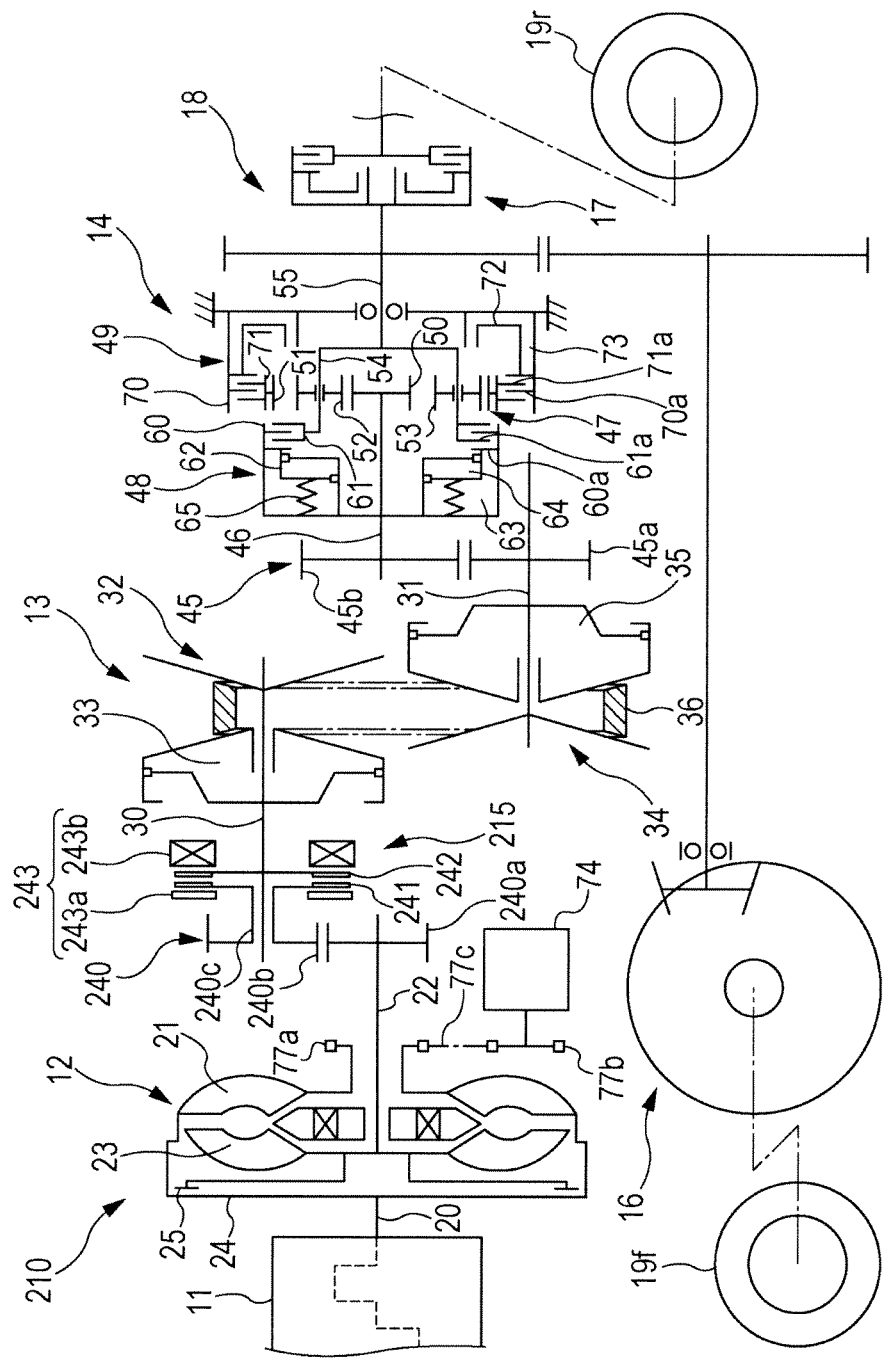
FIG. 6 is a schematic view showing a drive device for a vehicle according to a second embodiment of the present invention.

FIG. 6 is a schematic view showing a drive device for a vehicle according to the second embodiment of the present invention. In a drive device for a vehicle 210 shown in FIG. 6, an input clutch 215 has a different configuration. The reference numerals and symbols to be described below refer to the same components as those with the same reference numerals and symbols in the first embodiment, and descriptions thereof are omitted.

As shown in FIG. 6, the input clutch 215 is provided with a drive disk 241 installed on a hollow shaft 240*c* of a drive gear 240*b* and a driven disk 242 installed on a primary shaft 30. In addition, the input clutch 215 has an electromagnetic drive unit 243 for pressing the drive disk 241 and the driven disk 242 which face each other. The electromagnetic drive unit 243 includes a pressure plate 243*a* that is a magnetic body and an electromagnet 243*b* that faces the pressure plate 243*a*. The pressure plate 243*a* and the electromagnet 243*b* are disposed in such a manner as to hold the drive disk 241 and the driven disk 242 therebetween. When electric current is applied to the electromagnet 243*b*, the pressure plate 243*a* is attracted toward the magnetized electromagnet 243*b*. This causes the pressure plate 243*a* to be pressed against the drive disk 241 and the driven disk 242, which switches the input clutch 215 to the engaged state in which the power transmission path 18 is connected. On the other hand, when current application to the electromagnet 243*b* is suspended, the attraction of the pressure plate 243*a* by the electromagnet 243*b* is cancelled. This causes the pressure on the drive disk 241 and the driven disk 242 placed by the pressure plate 243*a* to be cancelled, which switches the input clutch 215 to the disengaged state in which the power transmission path 18 is disconnected. As described above, the input clutch 15 is a normally-open type input clutch which is switched to the engaged state when the electromagnet 243*b* is energized and is switched to the disengaged state when the electromagnet 243*b* is de-energized.

Figure 7:
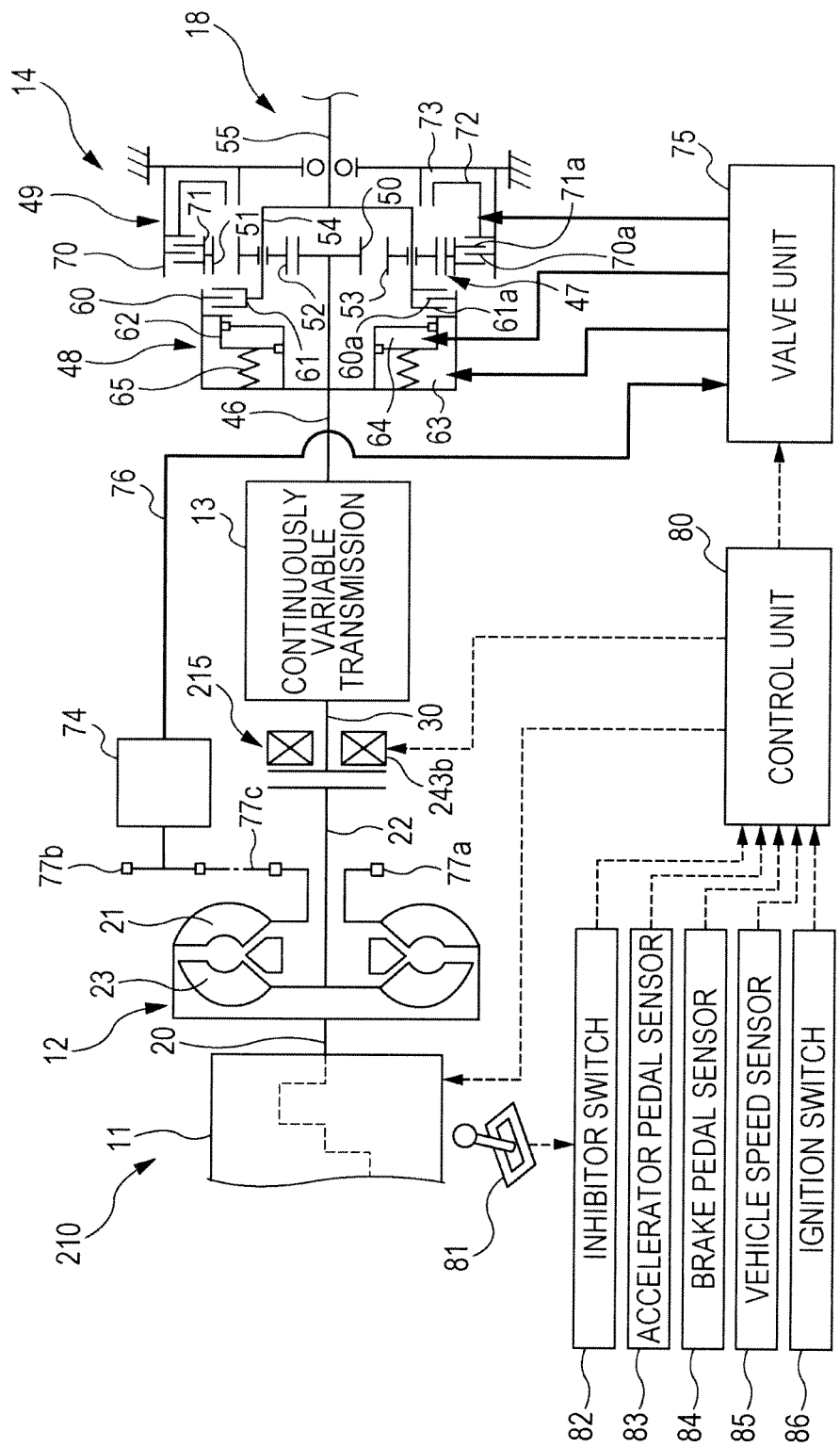
FIG. 7 is a schematic view showing part of the drive device for a vehicle together with a control system.

FIG. 7 is a schematic view showing part of the drive device for a vehicle 210 together with a control system. As shown in FIG. 7, the drive device for a vehicle 210 is provided with a control unit 80 for controlling the engine 11, a valve unit 75, the electromagnet 243*b*, and the like. The control unit 80 is connected with an inhibitor switch 82 for detecting an operating position (selection operation) of a select lever 81, an accelerator pedal sensor 83 for detecting an operation of an accelerator pedal, a brake pedal sensor 84 for detecting an operation of a brake pedal, a vehicle speed sensor 85 for detecting a vehicle speed, an ignition switch (activation switch) 86 operated by a driver, and the like are connected to. The control unit 80 makes a determination as to a vehicle status on the basis of information received from the sensors, and outputs a control signal to the engine 11, the valve unit 75, the electromagnet 243*b*, and the like. As described above, the control unit 80 performs energization control of the electromagnet 243*b* of the electromagnetic drive unit 243. The select lever 81 operated by the driver can be shifted to any of the P (parking) range, the N (neutral) range, the D (forward driving), and the R (rearward driving) position. Also, the control unit 80 has a CPU for calculating the control signal, a ROM for storing a control program, an arithmetic expression, map data and the like, and a RAM for temporarily storing data.

Next, the switching control for the input clutch 215 is described below. FIG. 8 is a flowchart for explaining switching control steps for the input clutch 215, which shows steps to be performed during from the activation of the ignition switch 86 to the deactivation. Note that the steps for input clutch switching control during an idling stop are performed in accordance with the flowchart shown in FIG. 3. In addition, the switching control steps for the input clutch 215 during an engine operation are performed in accordance with the flowchart shown in FIG. 4.

Figure 8:
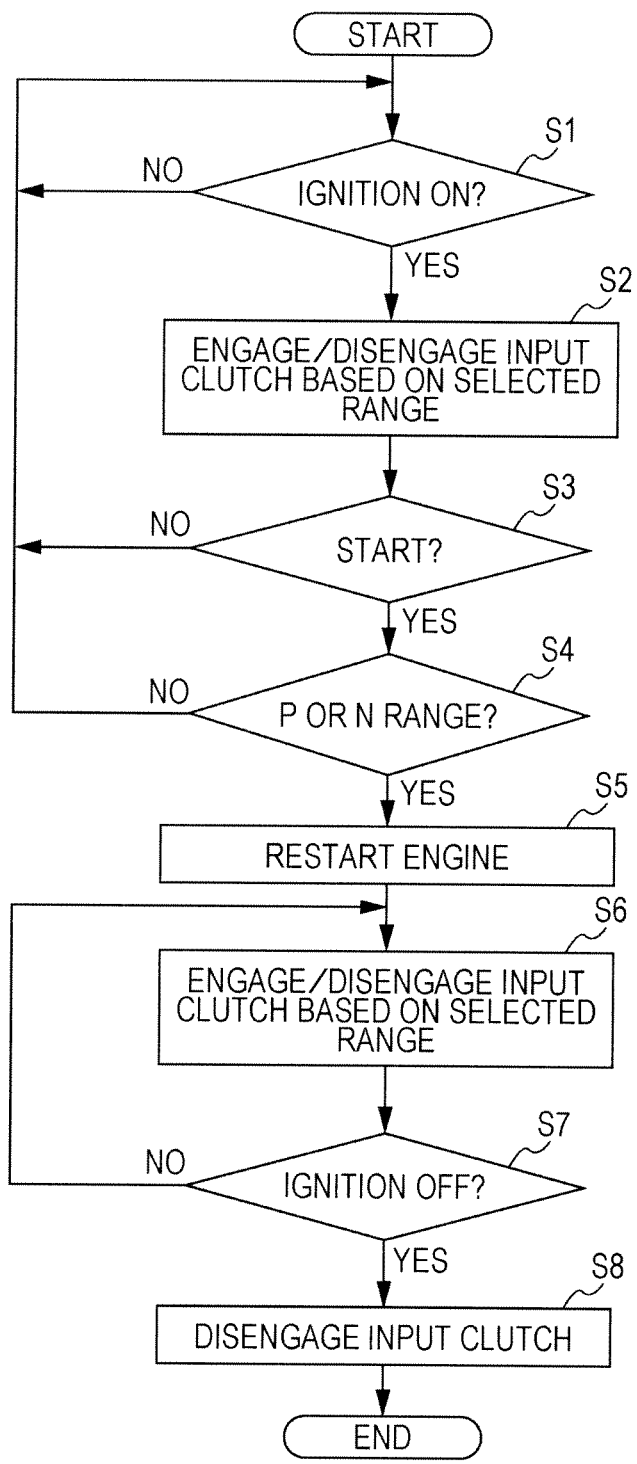
FIG. 8 is a flowchart for explaining input clutch switching control steps.

As shown in FIG. 8, a determination is made in step S1 as to whether or not the ignition switch 86 is turned on. If it is determined in step S1 that the ignition switch 86 has been turned on, namely, that a vehicle is in a vehicle activation state in which a control system of the vehicle is activated, the flow proceeds to step S2 where the input clutch 215 is switched to the engaged state or the disengaged state on the basis of an operating position of the select lever 81. In step S2, if the P range or the N range is selected, the input clutch 215 is switched to the disengaged state, and if the D range or the R range is selected, the input clutch 215 is switched to the engaged state.

A determination is made in step S3 as to whether or not the ignition switch 86 is turned to the start position. If it is determined in step S3 that the ignition switch 86 has been turned to the start position, the flow proceeds to step S4 where a determination is made as to the operating position of the select lever 81. If it is determined in step S4 that the P range or the N range is selected, the input clutch 215 is disengaged, causing the flow to proceed to step S5 where starting the engine 11 is permitted. On the other hand, if it is determined in step S4 that the D range or the R range is selected, the input clutch 215 is engaged, which disables starting of the engine 11. Then the flow returns to step S1 to repeat the routine. As described above, since it is anticipated during an engine start triggered via the starting operation of the ignition switch 86 that the continuously variable transmission 13 or the like has a significantly reduced oil pressure, the engine 11 is restarted under the condition where the input clutch 215 is disengaged with the object of preventing the drive chain 36 or the like from slipping.

Next, the input clutch 215 is switched to the engaged state or the disengaged state on the basis of the shift operation in step S6 and a determination is made as to whether or not the ignition switch 86 is turned off in step S7. If it is determined in step S7 that the ignition switch 86 has been turned on, the flow returns to step S6 to repeat the routine. On the other hand, if it is determined in step S7 that the ignition switch has been turned off, the flow proceeds to step S8 due to the vehicle shutdown state in which the vehicle control system is shut down, where the electromagnet 243*b* is de-energized and the input clutch 215 is switched to the disengaged state. As described above, in the vehicle activation state in which the ignition switch 86 is turned on, the electromagnet 243*b* of the input clutch 215 is subjected to energization control, which causes the input clutch 215 to be switched to the engaged state or the disengaged state depending on the shift operation by the driver. On the other hand, in the vehicle shutdown state in which the ignition switch 86 is turned off, the electromagnet 243*b* becomes de-energized as a result of the deactivation of the ignition switch 86, which causes the input clutch 215 to be switched to the disengaged state irrespective of the shift operation by the driver.

Thus, in the drive device for a vehicle 210 according to the second embodiment constructed in this manner, the same effect as in the first embodiment can be obtained. In addition, since the input clutch 215 is a normally-open input clutch that is disengaged during de-energization in the second embodiment, turning off the ignition switch 86 allows the input clutch 215 to be disengaged, thereby enabling the drive device for a vehicle to be switched to the neutral state. With this arrangement, even if the electromagnet 243*b* cannot be energized due to draining of a vehicle battery serving as a power source for the control system, the drive device for a vehicle 210 can be switched to the neutral state, thereby enabling vehicle towing or other work to be safely done.

A third embodiment of the present invention is described below with reference to FIGS. 9 through 13B.

Figure 9:
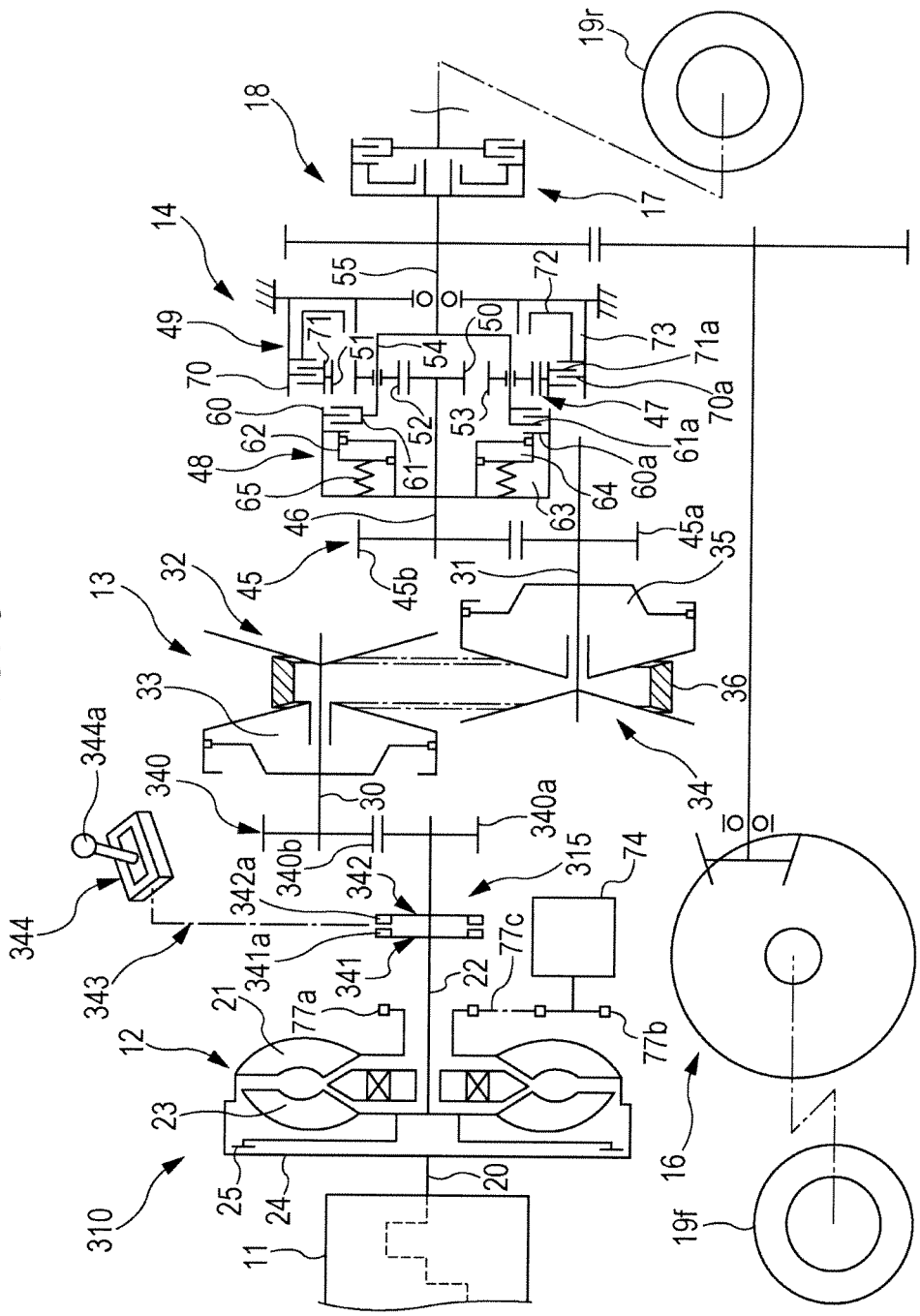
FIG. 9 is a schematic view showing a drive device for a vehicle according to a third embodiment of the present invention.

FIG. 9 is a schematic view showing a drive device for a vehicle according to the third embodiment of the present invention. In a drive device for a vehicle 310 shown in FIG. 9, a dog clutch (input clutch) 315 has a different configuration. The reference numerals and symbols to be described below refer to the same components as those with the same reference numerals and symbols in the first embodiment, and descriptions thereof are omitted.

As shown in FIG. 9, a dog clutch 315 and a gear train 340 are provided between the torque converter 12 and the continuously variable transmission 13 in order to transmit engine power from the torque converter 12 to the continuously variable transmission 13. The dog clutch 315 has a drive mating member 341 coupled to the turbine shaft 22 and a driven mating member 342 facing the drive mating member 341. The drive mating member 341 is provided with mating teeth 341*a*, while the driven mating member 342 is provided with mating teeth 342*a* facing the mating teeth 341*a*. In addition, an operation unit (manual shift control) 344 is mechanically connected to the driven mating member 342 via a link mechanism 343, in which operating (shift operation) a select lever 344*a* of the operation unit 344 allows the driven mating member 342 to be slid in an axial direction. The gear train 340 is provided with a drive gear 340*a* connected to the driven mating member 342 and a driven gear 340*b* connected to the primary shaft 30.

The select lever 344*a* operated by the driver can be shifted to any one of the D (forward driving) and R (rearward driving) ranges, which are types of the drive range, and the P (parking) range and the N (neutral) range, which are types of the non-driving range. Shifting the select lever 344*a* to the D range or the R range allows the driven mating member 342 to be moved toward the drive mating member 341. Doing this allows the mating teeth 341*a* to be engaged with the mating teeth 342*a*, thereby enabling the dog clutch 315 to be switched to the engaged state in which the power transmission path 18 is connected. On the other hand, shifting the select lever 344*a* to the P range or the N range allows the driven mating member 342 to be disengaged from the drive mating member 341. This allows the mating teeth 341*a* to be disengaged from the mating teeth 342*a*, thereby enabling the dog clutch 315 to be switched to the disengaged state in which the power transmission path 18 is disconnected. In other words, for transmission of engine power to the drive wheels 19*f* and 19*r*, the select lever is shifted to the D range or R range to cause the dog clutch 315 to be engaged, while, for interruption of the engine power transmission to the drive wheels 19*f* and 19*r*, the select lever is shifted to the P range or the N range to cause the dog clutch 315 to be disengaged.

The forward/backward switching mechanism 14 is connected to the secondary shaft 31 through a gear train 45 to cause engine power to be output from the continuously variable transmission 13 to the drive wheels 19*f* and 19*r*. The gear train 45 is provided with a drive gear 45*a* fixed to the secondary shaft 31 and a driven gear 45*b* fixed to a forward/backward input shaft 46 of the forward/backward switching mechanism 14. In addition, the forward/backward switching mechanism 14 includes a double-pinion type planetary gear train 47, a forward clutch 48, and a rearward brake 49. The planetary gear train 47 of the forward/backward switching mechanism 14 is provided with a sun gear 50 fixed to the forward/backward input shaft 46 and a ring gear 51 mounted axially outward so as to be rotatable. A plurality of pairs of planetary pinion gears 52 and 53 engaged with each other are provided between the sun gear 50 and the ring gear 51. The planetary pinion gears 52 and 53 connecting the sun gear 50 and the ring gear 51 are rotatably supported by a carrier 54 that is fixed to a forward/backward output shaft 55.

The forward clutch (friction engagement mechanism) 48 of the forward/backward switching mechanism 14 is provided with a clutch drum 60 fixed to the forward/backward input shaft 46 and a clutch hub 61 fixed to the carrier 54. A plurality of friction plates 60*a* and 61*a* are provided between the clutch drum 60 and the clutch hub 61, in which the friction plate 60*a* is supported by an inner surface of the clutch drum 60 and the friction plate 61*a* is supported by a peripheral surface of the clutch hub 61. A hydraulic piston 62 for pressing the friction plates 60*a* and 61*a* is slidably provided inside the clutch drum 60. The hydraulic piston 62 housed in the clutch drum 60 has an engagement oil chamber 63 defined at one side thereof and has a disengagement oil chamber 64 defined at the other side thereof. In addition, the engagement oil chamber 63 has a spring (biasing unit) 65 incorporated therein. The hydraulic piston 62 is biased by the spring 65 in an engagement direction. The engagement direction is a direction in which the hydraulic piston 62 moves toward the friction plates 60*a* and 61*a*, while a disengagement direction to be described later is a direction in which the hydraulic piston 62 moves away from the friction plates 60*a* and 61*a*.

Delivering hydraulic oil to the engagement oil chamber 63 of the forward clutch 48 and discharging hydraulic oil from the disengagement oil chamber 64 allow the hydraulic piston 62 to be moved in the engagement direction, thereby enabling the hydraulic piston 62 to be pressed against the friction plates 60a and 61a which in turn become engaged with one another. This causes the forward clutch 48 to enter an engaged state in which the clutch drum 60 and the clutch hub 61 are rotated in an integral manner. In contrast, discharging hydraulic oil from the engagement oil chamber 63 and delivering hydraulic oil to the disengagement oil chamber 64 allow the hydraulic piston 62 to be moved in the disengagement direction, thereby enabling the hydraulic piston 62 to be moved away from the friction plates 60a and 61a which in turn become disengaged from one another. This causes the forward clutch 48 to enter a disengaged state in which the clutch drum 60 and the clutch hub 61 are disengaged from each other. Even if hydraulic oil is discharged from both of the engagement oil chamber 63 and the disengagement oil chamber 64, the hydraulic piston 62 is biased by the spring 65 in the engagement direction, causing the forward clutch 48 to be in a slipping state or an engaged state. The slipping state of the forward clutch 48 is a state in which there is no predetermined amount of play among the friction plates 60a and 61a, before the friction plates 60a and 61a are completely engaged with one another. In other words, the slipping state of the forward clutch 48 is a state in which the friction plates 60a and 61a are in slight contact with one another in the process of a transition of the forward clutch 48 from the disengaged state to the engaged state.

In addition, the rearward brake 49 of the forward/backward switching mechanism 14 has a brake drum 70 fixed to a casing (not illustrated) and a brake hub 71 fixed to the ring gear 51. A plurality of friction plates 70a and 71a are provided between the brake drum 70 and the brake hub 71, in which the friction plate 70a is supported by an inner surface of the brake drum 70 and the friction plate 71a is supported by a peripheral surface of the brake hub 71. A hydraulic piston 72 for pressing the friction plates 70a and 71a is slidably provided inside the brake drum 70. Furthermore, the hydraulic piston 72 has an engagement oil chamber 73 defined at one side thereof. Delivering hydraulic oil to the engagement oil chamber 73 allows the hydraulic piston 72 to be moved in the engagement direction, thereby allowing the rearward brake 49 to be switched to the engaged state. The hydraulic piston 72 of the rearward brake 49 has a return spring (not illustrated) incorporated therein. Discharging hydraulic oil from the engagement oil chamber 73 causes the rearward brake 49 to be switched to the disengaged state by a spring force.

During forward travelling, the forward clutch 48 becomes engaged with the rearward brake 49 being disengaged. This arrangement directly connects the forward/backward input shaft 46 and the forward/backward output shaft 55, causing the engine power input to the forward/backward input shaft 46 to be transmitted to the forward/backward output shaft 55 with its rotational direction remaining unchanged. In contrast, during rearward travelling, the rearward brake 49 becomes engaged with the forward clutch 48 being disengaged. This arrangement causes the ring gear 51 to be fixed, causing the engine power input to the forward/backward input shaft 46 to be transmitted to the forward/backward output shaft 55 with its rotational direction changed to the opposite direction. As described above, the rotational direction of the forward/backward output shaft 55 can be changed by controlling the forward clutch 48 and the rearward brake 49 provided in the power transmission path 18.

Figure 10:
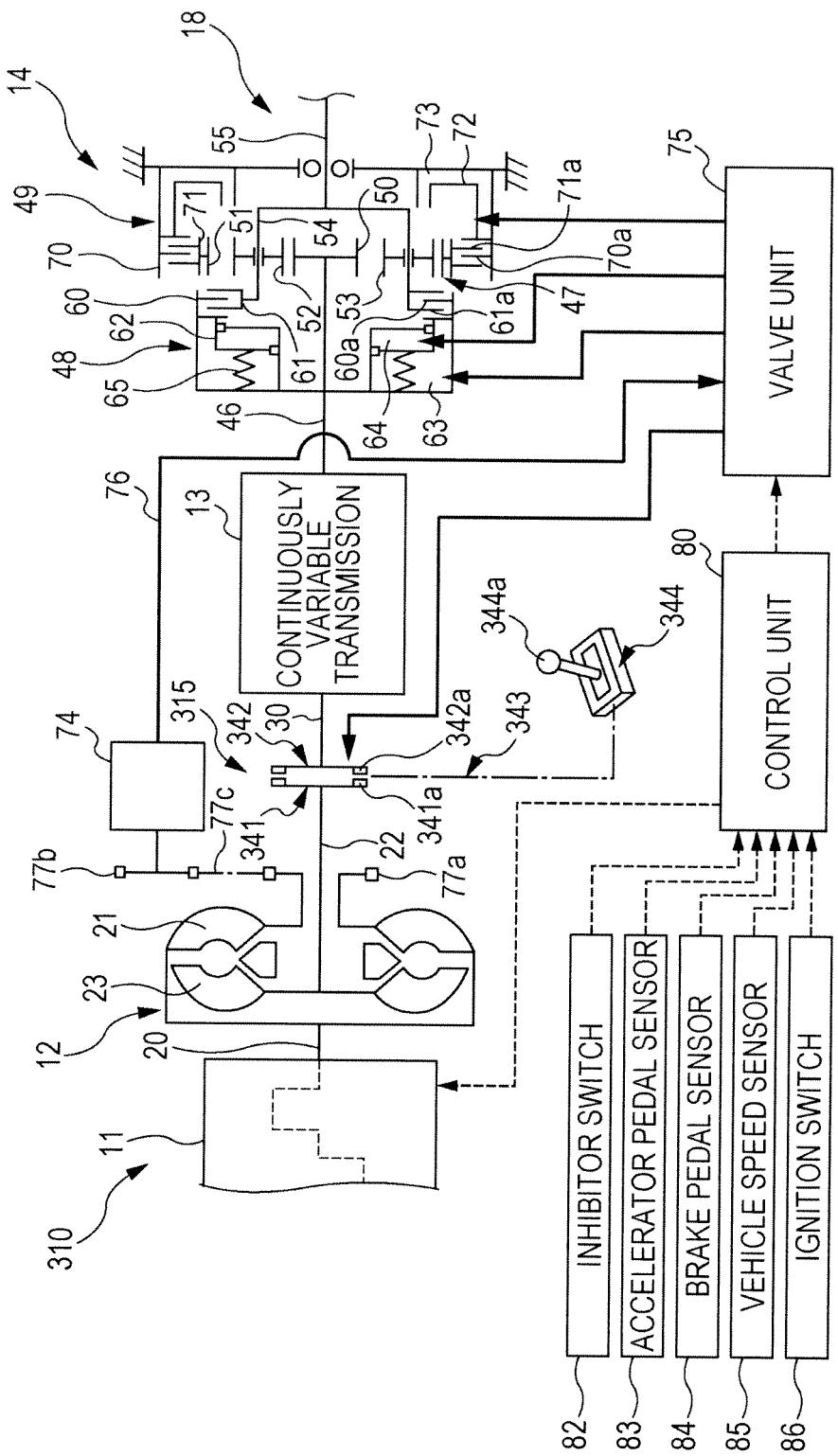
FIG. 10 is a schematic view showing part of the drive device for a vehicle together with a control system.

FIG. 10 is a schematic view showing part of the drive device for a vehicle 310 together with a control system. The drive device for a vehicle 310 is provided with a control unit 80 for controlling the engine 11, the valve unit 75, and the like. The control unit 80 is connected with an inhibitor switch 82 for detecting an operating position of a select lever 344a, an accelerator pedal sensor 83 for detecting an operation of an accelerator pedal, a brake pedal sensor 84 for detecting an operation of a brake pedal, a vehicle speed sensor 85 for detecting a vehicle speed, an ignition switch 86 operated by a driver, and the like. The control unit 80 makes a determination as to a vehicle status on the basis of information received from the sensors, and outputs a control signal to the engine 11, the valve unit 75, and the like. Also, the control unit 80 has a CPU for calculating the control signal, a ROM for storing a control program, an arithmetic expression, map data and the like, and a RAM for temporarily storing data.

As described above, the forward clutch 48 has the spring 65 incorporated therein for pressing the hydraulic piston 62 in the engagement direction, thereby allowing the forward clutch 48 to be held in the slipping state or the engaged state even in the case where control oil pressure is reduced due to an idling stop, which can prevent the forward clutch 48 from producing an engagement shock at the time of the engine restart. In addition, since the dog clutch 315 working with the shift operation is provided in the power transmission path 18, shifting the select lever 344a to the N range allows the dog clutch 315 to be disengaged, thereby enabling the engine 11 to be disconnected from the drive wheels 19f and 19r even during the engine shutdown. In other words, since the forward clutch 48 is held in the slipping state or engaged state through a spring force, the forward clutch 48 cannot be disengaged during the engine shutdown at which no control oil pressure is available, and as a result the drive device for a vehicle cannot be switched to the neutral state. To solve the problem, the drive device for a vehicle 310 according to the present embodiment is configured to provide the dog clutch 315 to be disengaged via the shift operation in the power transmission path 18 between the engine 11 and the drive wheels 19f and 19r. This arrangement allows the drive device for a vehicle 310 to be switched to the neutral state through the disengagement of the dog clutch 315 even during the engine shutdown, thereby enabling vehicle towing or other work to be safely done.

Figure 11:
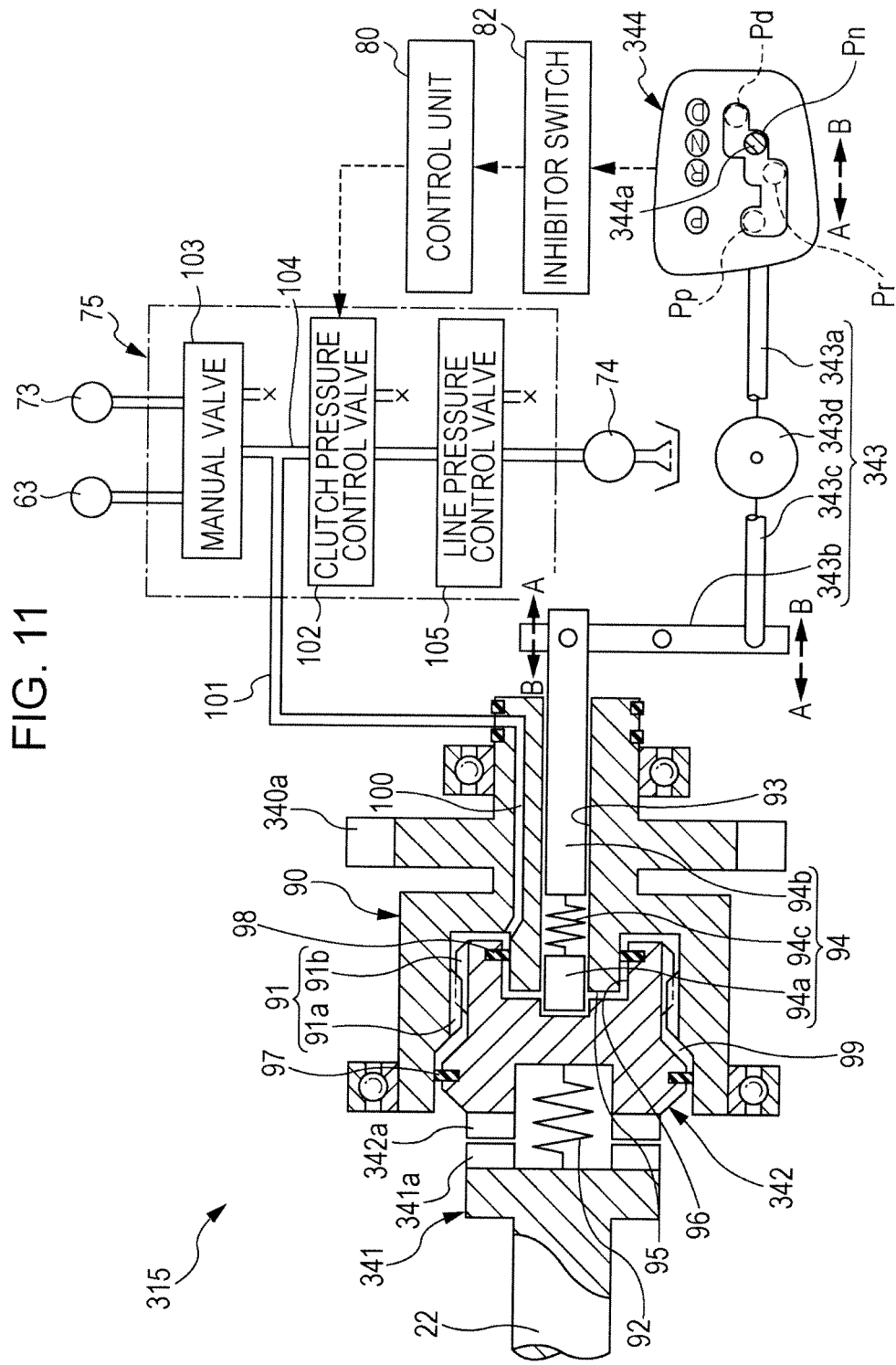
FIG. 11 is a schematic view showing a structure and control system of a dog clutch.

Next, the structure and control system of the dog clutch 315 is described below. FIG. 11 is a schematic view showing the structure and control system of the dog clutch 315. As shown in FIG. 11, the dog clutch 315 is provided with a drive mating member 341 connected to a turbine shaft 22 and a clutch drum (drum member) 90 fixed to the drive gear 340a. The clutch drum 90 has spline teeth 91a formed in an inner surface thereof, while a driven mating member 342 housed in the clutch drum 90 has spline teeth 91b formed in a peripheral surface thereof so as to be engaged with the spline teeth 91a. In other words, the spline teeth 91a and 91b which are engaged with one another constitute a spline connection 91 through which the clutch drum 90 is coupled to the peripheral portion of the driven mating member 342. As described above, the driven mating member 342 is axially slidably housed in the clutch drum 90, in which the driven mating member 342 moves between a forward position at which the driven mating member 342 is engaged with the drive mating member 341 and a rearward position at which the driven mating member 342 is disengaged from the drive mating member 341. A return spring 92 for biasing the driven mating member 342 toward the rearward position is provided between the drive mating member 341 and the driven mating member 342.

A clutch rod (rod member) 94 is slidably inserted into a through-hole 93 formed in the center of the clutch drum 90 in order to cause the driven mating member 342 of the dog clutch 315 to move between the forward position and the rearward position. The clutch rod 94 has a distal end member 94a and a proximal end member 94b, and a spring 94c that is an elastic member is incorporated in a gap between the distal end member 94a and the proximal end member 94b. In order to cause the clutch rod 94 to move axially, the clutch rod 94 and the operation unit 344 are connected to each other via a link mechanism 343. The link mechanism 343 includes a first link rod 343a connected to the select lever 344a, a link lever 343b connected to the proximal end member 94b, a second link rod 343c connected to the link lever 343b, and the like. A manual plate 343d is provided between the first link rod 343a and the second link rod 343c, and the movement of the first link rod 343a is transmitted to the second link rod 343c via the manual plate 343d. In other words, the movement of the select lever 344a manually operated by the driver is transmitted from the first link rod 343a to the second link rod 343c via the manual plate 343d, and then transmitted from the second link rod 343c to the clutch rod 94 via a link lever 343b. As shown in FIG. 11, the select lever 344a can be shifted to a P range position Pp corresponding the P range, a R range position Pr corresponding to the R range, an N range position Pn corresponding to the N range, and a D position range Pd corresponding to the D range. As indicated by an arrow A in FIG. 11, shifting the select lever 344a to the P range allows the clutch rod 94 to be moved in a direction in which the clutch rod 94 is pulled from the clutch drum 90. On the other hand, as indicated by an arrow B in FIG. 11, shifting the select lever 344a to the D range allows the clutch rod 94 to be moved in a direction in which the clutch rod 94 is inserted into the clutch drum 90.

As shown in FIG. 11, the clutch drum 90 has an annular convex portion 95 formed in the center thereof, and the driven mating member 342 housed in the clutch drum 90 has a circular concave portion 96 formed therein which corresponds to the annular convex portion 95. The driven mating member 342 has an oil seal 97 provided on the peripheral surface thereof, and the circular concave portion 96 of the driven mating member 342 has an oil seal 98 installed on the inner surface thereof. Installation of the pair of oil seals 97 and 98 in the driven mating member 342 as described above causes an engagement oil chamber 99 to be defined by the oil seals 97 and 98 between the clutch drum 90 and the driven mating member 342. The clutch drum 90 also has an clutch oil passage 100 formed so as to be opened to the engagement oil chamber 99, and a branch oil passage 101 extending from the valve unit 75 is connected to the clutch oil passage 100. The branch oil passage 101 connected to the clutch oil passage 100 is branched from an oil passage 104 connecting a clutch pressure control valve 102 and a manual valve 103 in the valve unit 75. In addition, as shown in FIG. 11, the oil seal 97 is provided at one end of the spline connection 91, while the oil seal 98 is provided in the other end of the spline connection 91. This arrangement causes the spline connection 91 to be disposed in the engagement oil chamber 99 defined in the back side of the driven mating member 342.

The valve unit 75 has a line pressure control valve 105, the clutch pressure control valve 102, the manual valve 103, and the like incorporated therein. Hydraulic oil discharged from the oil pump 74 is subjected to pressure regulation so as to have a basic pressure through the line pressure control valve 105, and further subjected to pressure regulation through the clutch pressure control valve 102 in accordance with the operating status of the forward clutch 48 and the rearward brake 49. The hydraulic oil subjected to pressure regulation through the clutch pressure control valve 102 is distributed to the engagement oil chamber 63 of the forward clutch 48 and the engagement oil chamber 73 of the rearward brake 49 through the manual valve 103 which is switched in conjunction with the select lever 344a. The clutch pressure control valve 102 is controlled by the control unit 80. When the D range is selected, the hydraulic oil for engaging the forward clutch 48 is subjected to pressure regulation through the clutch pressure control valve 102. In contrast, when the R range is selected, the hydraulic oil for engaging the rearward brake 49 is subjected to pressure regulation through the clutch pressure control valve 102. In other words, when either one of the D range and the R range which engage the forward clutch 48 and the rearward brake 49 respectively is selected, hydraulic oil is delivered to an oil passage 104 connecting the clutch pressure control valve 102 and the manual valve 103. On the other hand, when either one of the P range and the N range which disengage the forward clutch 48 and the rearward brake 49 respectively is selected, hydraulic oil is discharged from the oil passage 104 connecting the clutch pressure control valve 102 and the manual valve 103. Accordingly, when the D range or the R range is selected, hydraulic oil is delivered to the engagement oil chamber 99 through the branch oil passage 101 and the clutch oil passage 100. In contrast, when the range P or the N range is selected, hydraulic oil in the engagement oil chamber 99 is discharged from the clutch pressure control valve 102 through the clutch oil passage 100 and the branch oil passage 101.

Figure 12A:
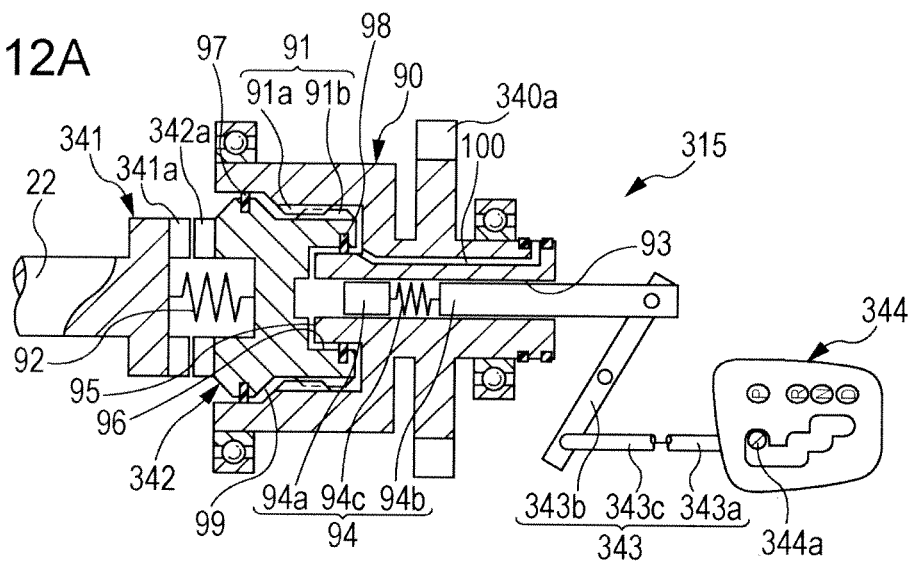
FIGS. 12A, 12B, and 12C are explanatory diagrams showing an operation status of the dog clutch.

Next, the operation status of the dog clutch 315 which is switched to an engaged state or a disengaged state via a shift operation is described below. FIGS. 12A through 13B are explanatory diagrams showing the operation status of the dog clutch 315. White arrows placed in FIGS. 12B and 13B indicate paths through which power is transmitted. As shown in FIG. 12A, when the P range is selected via the shift operation, the distal end member 94a of the clutch rod 94 moves away from the driven mating member 342. Due to the selection of the P range which disengages the forward clutch 48 and the rearward brake 49, hydraulic oil is discharged from the engagement oil chamber 99 of the dog clutch 315. As described above, when the P range is selected via the shift operation, the return spring 92 moves the driven mating member 342 to the rearward position through its spring force, which causes the dog clutch 315 to be switched to the disengaged state.

Figure 12B:
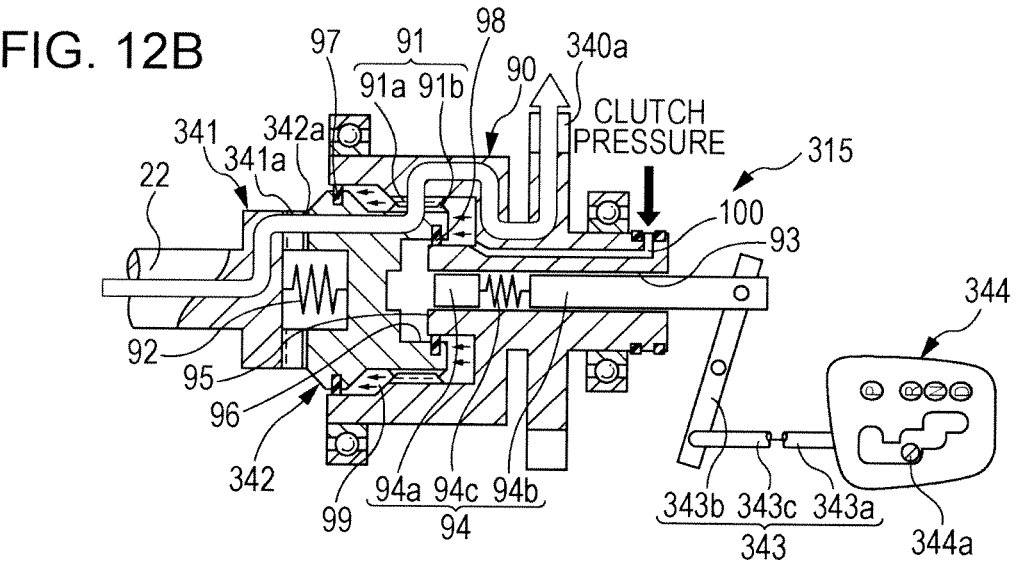

As shown in FIG. 12B, when the R range is selected via the shift operation, the distal end member 94a of the clutch rod 94 moves away from the driven mating member 342. However, due to the selection of the R range which engages the rearward brake 49, hydraulic oil is delivered to the engagement oil chamber 99 of the dog clutch 315 through the clutch pressure control valve 102. As described above, when the R range is selected via the shift operation, the hydraulic oil pushes the driven mating member 342 to the forward position, which causes the dog clutch 315 to be switched to the engaged state.

Figure 12C:
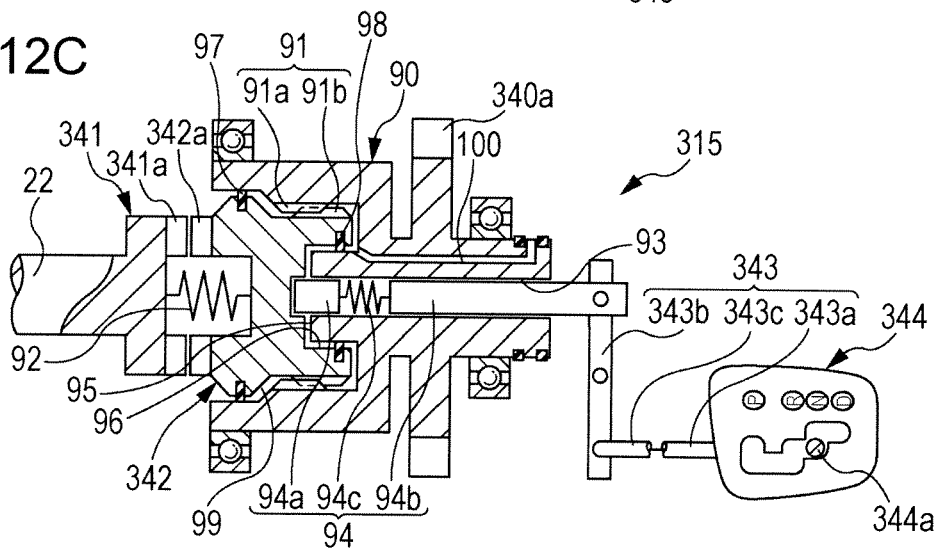

As shown in FIG. 12C, when the N range is selected via the shift operation, the distal end member 94a of the clutch rod 94 moves away from the driven mating member 342. Due to the selection of the N range which disengages the forward clutch 48 and the rearward brake 49, hydraulic oil is discharged from the engagement oil chamber 99 of the dog clutch 315. As described above, when the N range is selected via the shift operation, the return spring 92 moves the driven mating member 342 to the rearward position through its spring force, which causes the dog clutch 315 to be switched to the disengaged state.

Figure 13A:
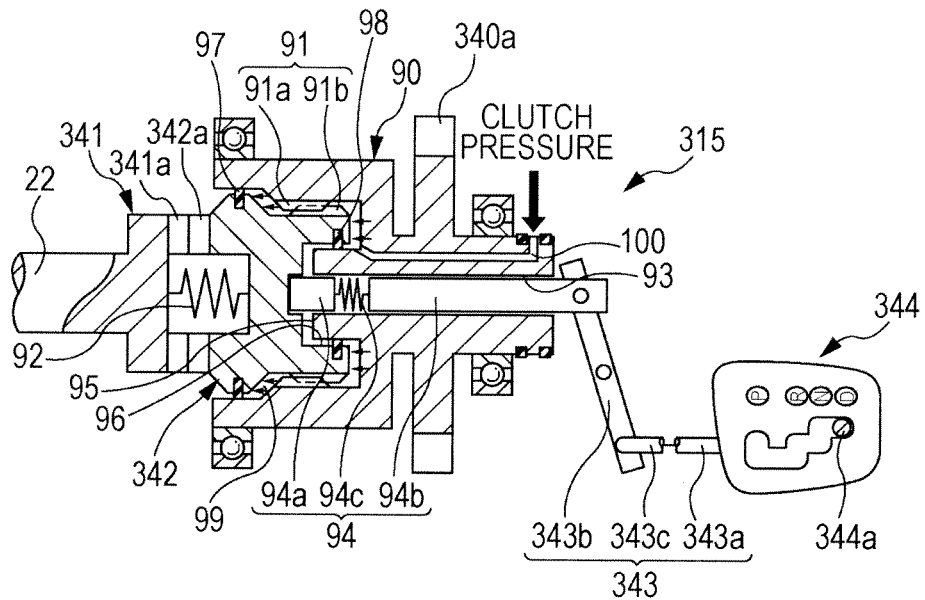
FIGS. 13A and 13B are explanatory diagrams showing an operation status of the dog clutch.
Figure 13B:
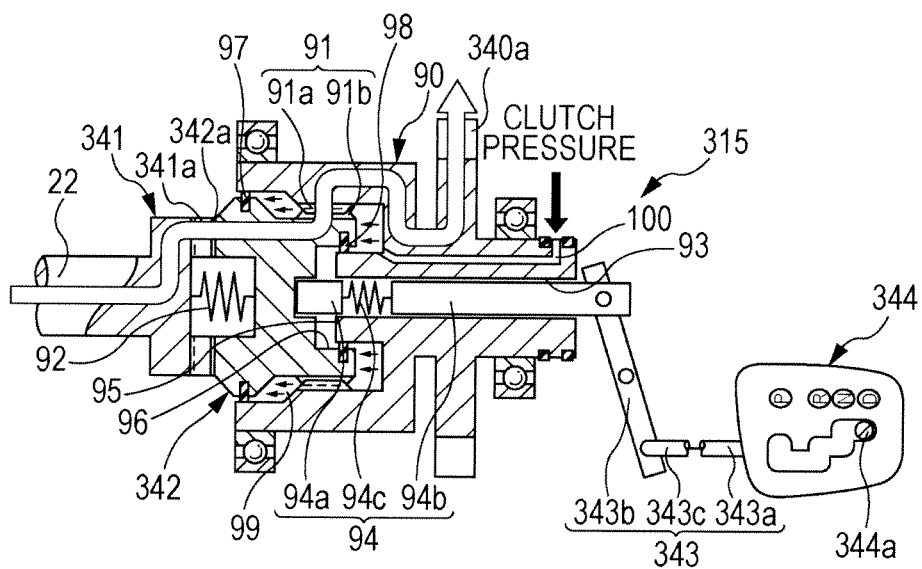

Next, as shown in FIG. 13A, when the D range is selected via shift operation, the clutch rod 94 is pushed to the clutch drum 90, which causes the distal end member 94a to be pressed against the spring 94c while the distal end member 94a is in contact with the driven mating member 342. As shown in FIG. 13B, when the drive mating member 341 and the driven mating member 342 rotate in relation to each other to cause the mating teeth 341a, 342a opposed to one another to be mated with one another, the spring 94c pushes the driven mating member 342 to the forward position through its spring force, causing the dog clutch 315 to be switched to the engaged state. As described above, incorporating the spring 94c in the clutch rod 94 allows the select lever 344a to be shifted to the R range before the engagement of the dog clutch 315. In other words, the incorporation of the spring 94c allows the distal end member 94a to be pressed against the driven mating member 342 while the distal end member 94a follows the driven mating member 342, thereby enabling the dog clutch 315 to be put into an engagement wait state. This arrangement allows the dog clutch 315 to be switched to the engaged state without causing the driver to feel discomfort while he or she shifts the select lever 344a.

In addition, as shown in FIGS. 13A and 13B, due to the selection of the D range which engages the forward clutch 48, hydraulic oil is delivered to the engagement oil chamber 99 of the dog clutch 315 through the clutch pressure control valve 102. In other words, hydraulic pressure assists in pushing the driven mating member 342, thereby reducing effort needed to shift the select lever 344a. Even after the dog clutch 315 is switched to the engaged state, the hydraulic pressure keeps the driven mating member 342 at the forward position, which prevents the dog clutch 315 from being disengaged, thereby enhancing the reliability of the dog clutch 315. Furthermore, since the spline connection 91 is located in the engagement oil chamber 99 of the dog clutch 315, the spline connection 91 can be lubricated with the hydraulic oil in the engagement oil chamber 99.

In the above description, when the R range is selected via the shift operation, the engagement of the dog clutch 315 is accomplished by only the hydraulic oil delivered to the engagement oil chamber 99. However, the engagement is not limited to this. The dog clutch 315 may be engaged by pushing the clutch rod 94 until contact with the driven mating member 342 is established. In addition, when the D range is selected via the shift operation, the engagement of the dog clutch 315 is accomplished by pushing the clutch rod 94 until contact with the driven mating member 342 is established. However, the engagement is not limited to this. The dog clutch 315 may be engaged by only the hydraulic oil delivered to the engagement oil chamber 99. Furthermore, when the D range is selected via the shift operation, hydraulic pressure assists in pushing the driven mating member 342. However, pushing is not limited to this. The driven mating member 342 may be pushed by only the shift operation of the select lever 344a.

A fourth embodiment of the present invention is described below with reference to FIGS. 14 through 19.

FIG. 14 is a schematic view showing the structure and control system of the dog clutch 315 according to the fourth embodiment of the present invention. The fourth embodiment is a modification of the third embodiment. For this, a schematic view showing a drive device for a vehicle and a schematic view showing part of a drive device for a vehicle together with a control system according to the fourth embodiment are the same as those of the third embodiment and are omitted. The reference numerals and symbols to be described below refer to the same components as those with the same reference numerals and symbols in the third embodiment, and a dog clutch 315 having a structure different from that of the third embodiment is described below.

As shown in FIG. 14, the select lever 344a can be shifted to a P range position Pp corresponding the P range, a R range position Pr corresponding to the R range, an N range position Pn corresponding to the N range, and a D range position Pd corresponding to the D range. As shown in FIG. 14, shifting the select lever 344a in a direction indicated by an arrow A1 allows a cam 496 to be rotated in a direction indicated by an arrow A2. On the other hand, shifting the select lever 344a in a direction indicated by an arrow B1 allows the cam 496 to be rotated in a direction indicated by an arrow B2. The cam 496 has the cam profiles of two cam lobes 496d and 496r that correspond to the D and R ranges, respectively. When the select lever 344a is shifted to the D range position Pd, the cam lobe 496d of the rotating cam 496 comes to face the proximal end member 94b, thereby allowing the cam lobe 496d to push the proximal end member 94b. On the other hand, when the select lever 344a is shifted to the R range position Pr, the cam lobe 496r of the rotating cam 496 comes to face the proximal end member 94b, thereby allowing the cam lobe 496r to push the proximal end member 94b. In addition, when the select lever 344a is shifted to the P range position Pp or the N range position Pn, the proximal end member 94b comes into contact with a base circle 496a of the cam 496, thereby cancelling the pushing of the proximal end member 94b by the cam lobes 496d and 496r.

As shown in FIG. 14, the clutch drum 90 has an annular convex portion 95 formed in a center thereof, and the driven mating member 342 housed in the clutch drum 90 has a circular concave portion 96 formed therein which corresponds to the annular convex portion 95. The driven mating member 342 has an oil seal 97 provided on the peripheral surface thereof, and the circular concave portion 96 of the driven mating member 342 has an oil seal 98 installed on the inner surface thereof. Installation of the pair of oil seals 97 and 98 in the driven mating member 342 as described above causes an engagement oil chamber 99 to be defined by the oil seals 97 and 98 between the clutch drum 90 and the driven mating member 342. The clutch drum 90 also has an clutch oil passage 110 formed so as to communicate with the engagement oil chamber 99, and a branch oil passage 111 extending from the valve unit 75 is connected to the clutch oil passage 110. The branch oil passage 111 connected to the clutch oil passage 110 is branched from an oil passage 114 connecting a clutch pressure control valve 112 and a manual valve 113 in the valve unit 75. In addition, as shown in FIG. 14, the oil seal 97 is provided at one end of the spline connection 91, while the oil seal 98 is provided in the other end of the spline connection 91. This arrangement causes the spline connection 91 to be disposed in the engagement oil chamber 99 defined in the back side of the driven mating member 342.

The valve unit 75 has a line pressure control valve 105, the clutch pressure control valve 112, the manual valve 113, and the like incorporated therein. Hydraulic oil discharged from the oil pump 74 is subjected to pressure regulation so as to have a basic pressure through the line pressure control valve 105, and further subjected to pressure regulation through the clutch pressure control valve 112 in accordance with the operating status of the forward clutch 48 and the rearward brake 49. The hydraulic oil subjected to pressure regulation through the clutch pressure control valve 112 is distributed to the engagement oil chamber 63 of the forward clutch 48 and the engagement oil chamber 73 of the rearward brake 49 through the manual valve 113 which is switched in conjunction with the select lever 344a. The clutch pressure control valve 112 is controlled by the control unit 80. When the D range is selected, the hydraulic oil for engaging the forward clutch 48 is subjected to pressure regulation through the clutch pressure control valve 112. In contrast, when the R range is selected, the hydraulic oil for engaging the rearward brake 49 is subjected to pressure regulation through the clutch pressure control valve 112. In other words, when either one of the D range and the R range which engage the forward clutch 48 and the rearward brake 49 respectively is selected, hydraulic oil is delivered to an oil passage 114 connecting the clutch pressure control valve 112 and the manual valve 113. On the other hand, when either one of the P range and the N range which disengage the forward clutch 48 and the rearward brake 49 respectively is selected, hydraulic oil is discharged from the oil passage 114 connecting the clutch pressure control valve 112 and the manual valve 113. Accordingly, when the D range or the R range is selected, hydraulic oil is delivered to the engagement oil chamber 99 through the branch oil passage 111 and the clutch oil passage 110. In contrast, when the P range or the N range is selected, hydraulic oil in the engagement oil chamber 99 is discharged from the clutch pressure control valve 112 through the clutch oil passage 110 and the branch oil passage 111.

Figure 15A:
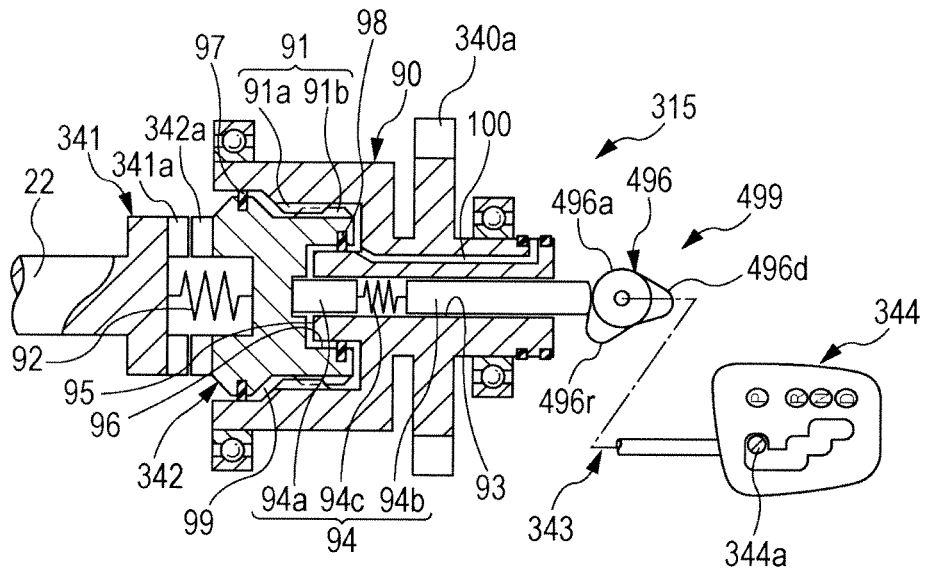
FIG. 15A is an explanatory diagram showing an operation status of the dog clutch when a select lever is shifted to a P range.
Figure 15B:
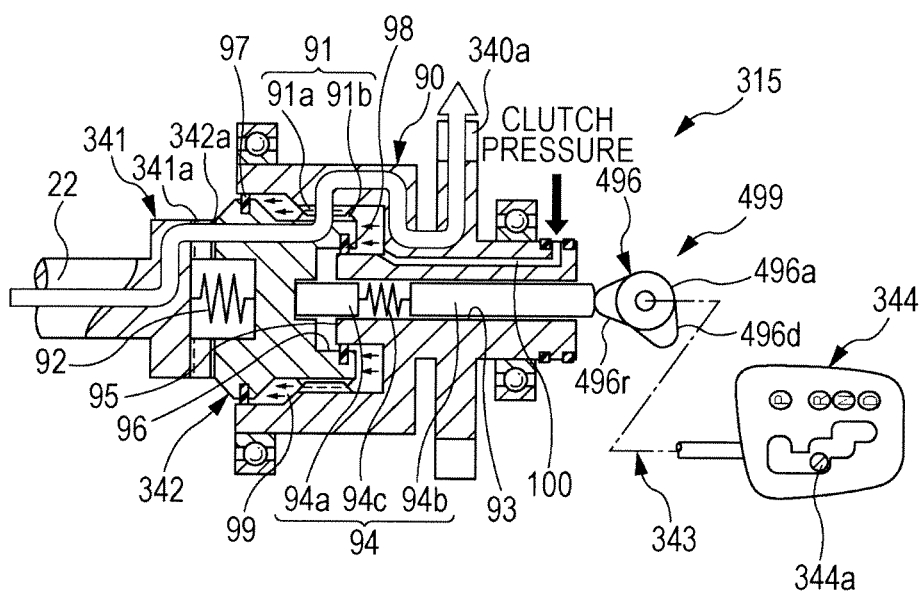
FIG. 15B is an explanatory diagram showing the operation status of the dog clutch when the select lever is shifted to an R range.
Figure 16A:
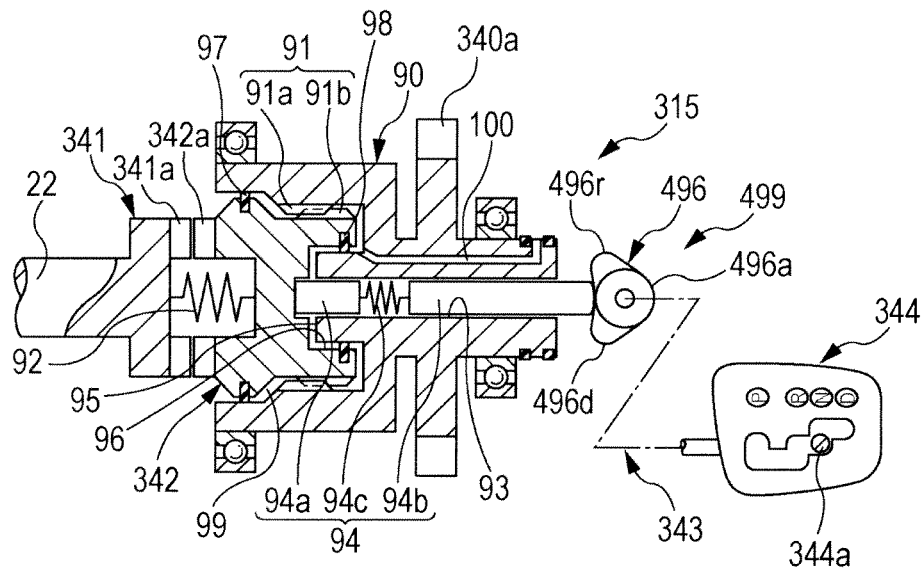
FIG. 16A is an explanatory diagram showing an operation status of the dog clutch when the select lever is shifted to an N range.
Figure 16B:
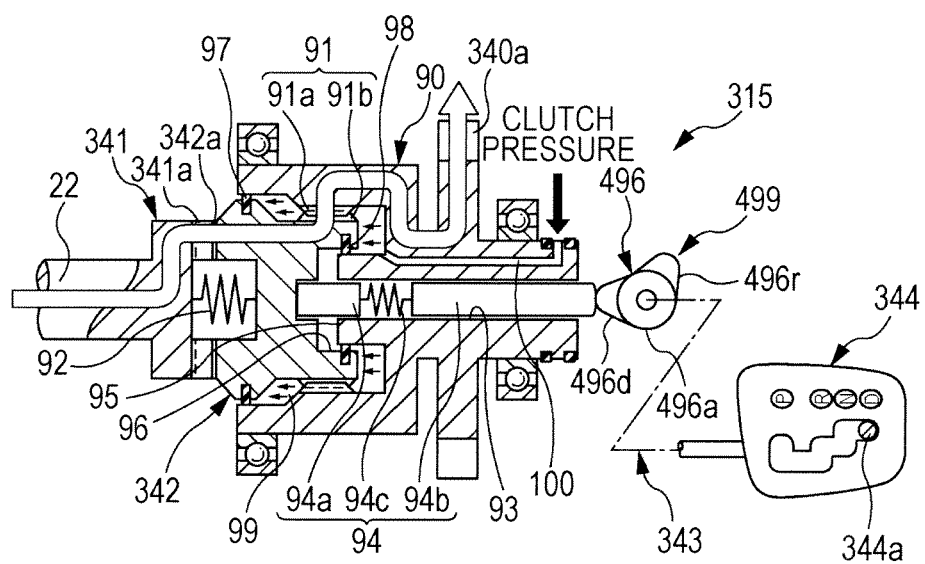
FIG. 16B is an explanatory diagram showing an operation status of the dog clutch when the select lever is shifted to a D range.

Next, the operation status of the dog clutch 315 which is switched to an engaged state or a disengaged state via the shift operation is described below. FIG. 15A is an explanatory diagram showing the operation status of the dog clutch 315 when the P range is selected. FIG. 15B is an explanatory diagram showing the operation status of the dog clutch 315 when the R range is selected. In addition, FIG. 16A is an explanatory diagram showing the operation status of the dog clutch 315 when the N range is selected. FIG. 16B is an explanatory diagram showing the operation status of the dog clutch 315 when the D range is selected. White arrows placed in FIGS. 15B and 16B indicate a paths through which power is transmitted.

As shown in FIG. 15A, when the P range is selected via the shift operation, the proximal end member 94b of the clutch rod 94 comes into contact with the base circle 496a of the cam 496, which causes pushing of the clutch rod 94 into the driven mating member 342 to be cancelled. Due to the selection of the P range which disengages the forward clutch 48 and the rearward brake 49, hydraulic oil is discharged from the engagement oil chamber 99 of the dog clutch 315. As described above, when the P range is selected via the shift operation, the return spring 92 moves the driven mating member 342 to the rearward position through its spring force, which causes the dog clutch 315 to be switched to the disengaged state.

As shown in FIG. 15B, when the R range is selected via the shift operation, the proximal end member 94b of the clutch rod 94 comes into contact with the cam lobe 496r of the cam 496, which causes the clutch rod 94 to be pushed to the driven mating member 342. Due to the selection of the R range which engages the rearward brake 49, hydraulic oil is delivered to the engagement oil chamber 99 of the dog clutch 315 through the clutch pressure control valve 112. As described above, when the R range is selected via the shift operation, shift effort of the select lever 344a by the driver and the hydraulic oil in the engagement oil chamber 99 push the driven mating member 342 to the forward position, which causes the dog clutch 315 to be switched to the engaged state.

As shown in FIG. 16A, when the N range is selected via the shift operation, the proximal end member 94b of the clutch rod 94 comes into contact with the base circle 496a of the cam 496, which causes pushing of the clutch rod 94 into the driven mating member 342 to be cancelled. Due to the selection of the N range which disengages the forward clutch 48 and the rearward brake 49, hydraulic oil is discharged from the engagement oil chamber 99 of the dog clutch 315. As described above, when the N range is selected via the shift operation, the return spring 92 moves the driven mating member 342 to the rearward position through its spring force, which causes the dog clutch 315 to be switched to the disengaged state.

As shown in FIG. 16B, when the D range is selected via the shift operation, the proximal end member 94b of the clutch rod 94 comes into contact with the cam lobe 496d of the cam 496, which causes the clutch rod 94 to be pushed to the driven mating member 342. Due to the selection of the D range which engages the forward clutch 48, hydraulic oil is delivered to the engagement oil chamber 99 of the dog clutch 315 through the clutch pressure control valve 112. As described above, when the D range is selected via the shift operation, shift effort of the select lever 344a by the driver and the hydraulic oil in the engagement oil chamber 99 push the driven mating member 342 to the forward position, which causes the dog clutch 315 to be switched to the engaged state.

As described above, controlling the clutch rod 94 with the cam 496 which rotates in conjunction with shift operation allows the clutch rod 94 to be pushed in both the D and R ranges, thereby enabling the dog clutch 315 to be engaged in more than one range. In other words, in order to cause the dog clutch 315 to be engaged in the D and R ranges, the clutch rod 94 must be pushed in the D and R ranges, and be pulled in the P and N ranges. If the select lever 344a and the clutch rod 94 are connected to each other without using a cam mechanism 499, the clutch rod 94 cannot be pushed to a same position in both the D and R ranges which are different in the shift position of the select lever 344a. In contrast, if the select lever 344a and the clutch rod 94 are connected to each other using the cam mechanism 499, the clutch rod 94 can be pushed to a same position in both the D and R ranges which are different in shift position of the select lever 344a. Although the cam 496 has the two cam lobes 496d and 496r in the attached figures, the cam 496 may have three or more cam lobes formed thereon if one or more drive ranges are available in addition to the D and R ranges.

Figure 17A:
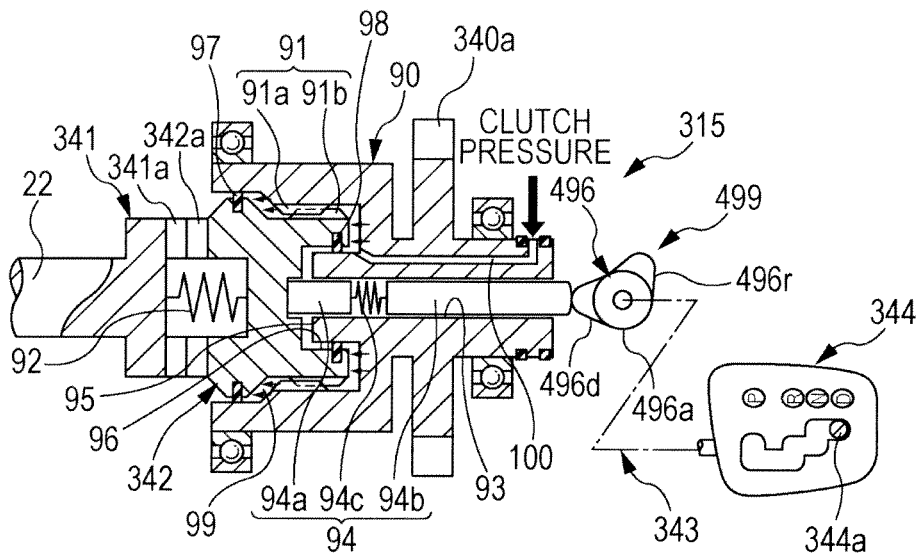
FIGS. 17A and 17B are explanatory diagrams showing a process in which the dog clutch is engaged when the select lever is shifted to the D range.
Figure 17B:
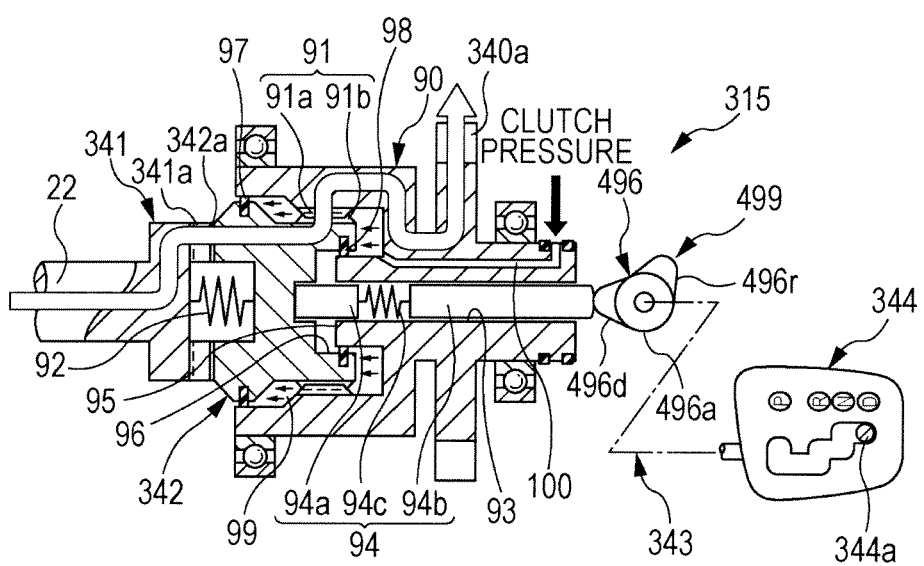

FIGS. 17A and 17B are explanatory diagrams showing a process in which the dog clutch 315 is engaged when the D range is selected. As shown in FIG. 17A, when the select lever 344a is shifted to the R range, the cam lobe 496d of the cam 496 pushes the clutch rod 94, which causes the distal end member 94a to be pressed against the spring 94c while the distal end member 94a is in contact with the driven mating member 342. As shown in FIG. 17B, when the drive mating member 341 and the driven mating member 342 rotate in relation to each other to cause the mating teeth 341a and 342a facing one another to be mated with one another, the spring 94c pushes the driven mating member 342 to the forward position through its spring force, causing the dog clutch 315 to be switched to the engaged state. As described above, incorporating the spring 94c in the clutch rod 94 allows the select lever 344a to be shifted to the D range before the engagement of the dog clutch 315. In other words, the incorporation of the spring 94 allows the distal end member 94a to follow the driven mating member 342, thereby enabling the dog clutch 315 to be put into an engagement wait state. This arrangement allows the dog clutch 315 to be switched to the engaged state without giving discomfort to the driver shifting the select lever 344a. FIGS. 17A and 17B show a state in which the D range is selected. Even if the R range is selected, the select lever 344a can be shifted to the R range likewise, before the engagement of the dog clutch 315.

In addition, as shown in FIG. 15B or 16B, when the D or R range is selected via the shift operation, hydraulic oil is delivered to the engagement oil chamber 99 of the dog clutch 315 through the clutch pressure control valve 112. In other words, hydraulic pressure assists in pushing the driven mating member 342, thereby reducing effort needed to shift the select lever 344a. Even after the dog clutch 315 is switched to the engaged state, the hydraulic pressure keeps the driven mating member 342 at the forward position, which prevents the dog clutch 315 from being disengaged, thereby enhancing the reliability of the dog clutch 315. Furthermore, since the spline connection 91 is located in the engagement oil chamber 99 of the dog clutch 315, the spline connection 91 can be lubricated with the hydraulic oil in the dog clutch 315. In the above description, when the D or R range is selected via the shift operation, hydraulic pressure assists in pushing the driven mating member 342. However, the driven mating member 342 may be pushed only by shift effort of the select lever 344a by the driver.

Although the clutch rod 94 is pushed directly by the cam 496 in the above description, a lever member 121 may be provided between the cam 496 and the clutch rod 94. FIG. 18 is a schematic view showing the structure and control system of a dog clutch 315 provided in a drive device for a vehicle according to a modification of the present embodiment. The reference numerals and symbols in FIG. 18 refer to the same components as those with the same reference numerals and symbols in FIG. 3, and descriptions thereof are omitted. As shown in FIG. 18, the lever member 121 is swingable about a lever shaft 120 and provided between the cam 496 and the clutch rod 94. One end 121a of the lever member 121 is connected to the proximal end member 94b of the clutch rod 94, while the other end 121b of the lever member 121 is in sliding contact with the cam 496 disposed close to the lever member 121. Shifting the select lever 344a in a direction indicated by an arrow A1 allows the cam 496 to be rotated in a direction indicated by an arrow A2. On the other hand, shifting the select lever 344a in a direction indicated by an arrow B1 allows the cam 496 to be rotated in a direction indicated by an arrow B2. When the D range is selected, the cam lobe 496d of the rotating cam 496 pushes the other end 121b of the lever member 121, which causes the one end 121a of the lever member 121 to push the proximal end member 94b. Likewise, when the R range is selected, the cam lobe 496r of the rotating cam 496 pushes the other end 121b of the lever member 121, which causes the one end 121a of the lever member 121 to push the proximal end member 94b. In addition, when the P or N range is selected, the other end 121b of the lever member 121 comes into contact with the base circle 496a of the cam 496, cancelling pushing of the proximal end member 94b by the cam lobes 496d and 496r. As is the case for the afore-mentioned drive device for a vehicle 10, even if the movement of the cam 496 is transmitted to the clutch rod 94 via the lever member 121, the clutch rod 94 can be pushed in both the D and R ranges, thereby enabling the dog clutch 315 to be engaged in more than one range.

Figure 19:
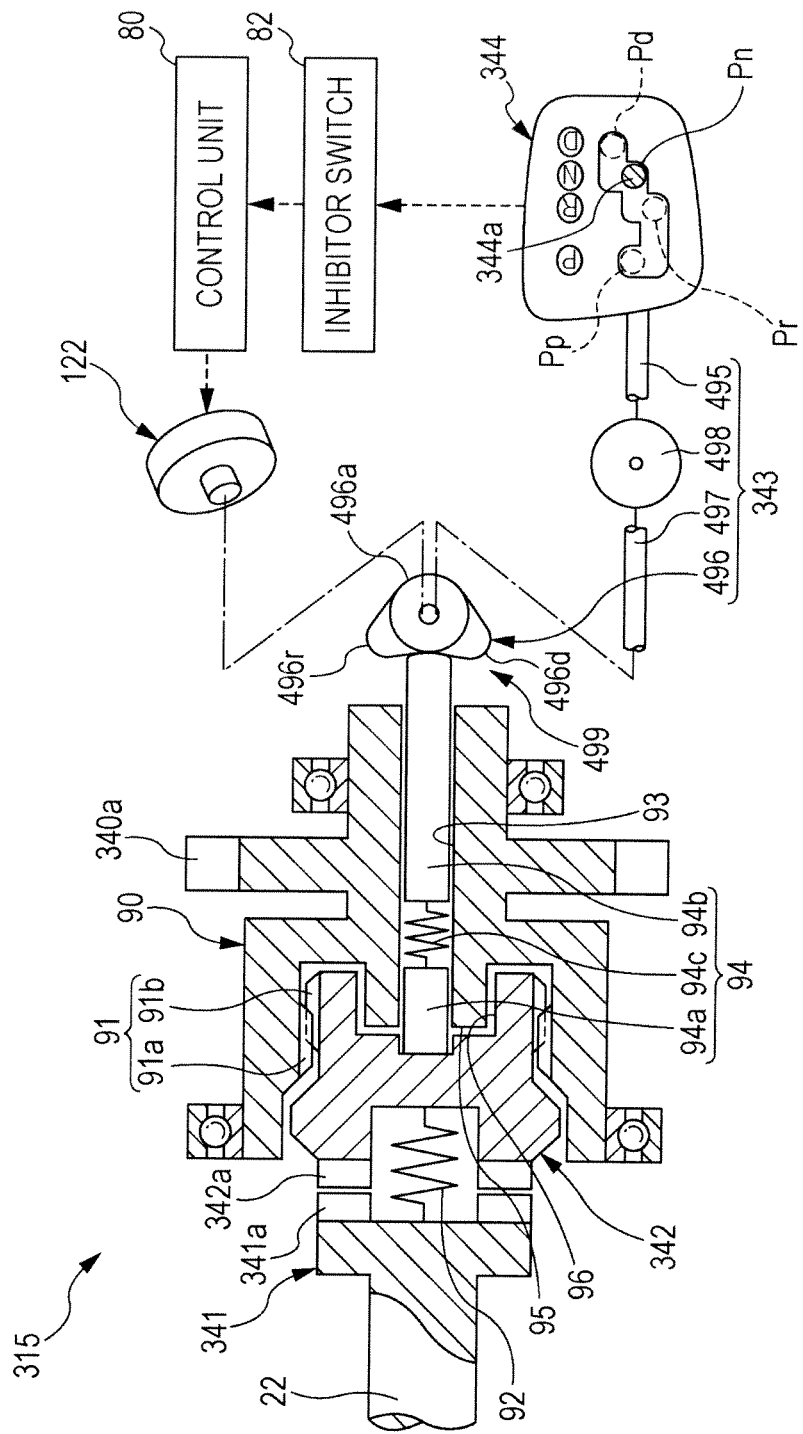
FIG. 19 is a schematic view showing a structure and control system of a dog clutch provided in a drive device for a vehicle according to another modification of the fourth embodiment.

Although hydraulic pressure assists in pushing the driven mating member 342 in the above description, other actuators may be used to assist in pushing the driven mating member 342. FIG. 19 is a schematic view showing the structure and control system of a dog clutch 315 provided in a drive device for a vehicle according to another modification of the present embodiment. The reference numerals and symbols in FIG. 19 refer to the same components as those with the same reference numerals and symbols in FIG. 14, and descriptions thereof are omitted. As shown in FIG. 19, not only a second rod 497 of the link mechanism 443, but also an electric rotary actuator 122 is connected to the cam 496 disposed close to the clutch rod 94. The rotary actuator 122 is controlled via a control signal from the control unit 80 so as to rotate the cam 496 in conjunction with the shift operation of a driver. When the D or R range is selected, this arrangement allows the rotary actuator 122 to assist in driving the cam 496, thereby reducing effort needed to shift the select lever 344a, as is the case for the afore-mentioned drive device for a vehicle.

Next, a fifth embodiment of the present invention is described below with reference to FIGS. 20 through 23.

Figure 20:
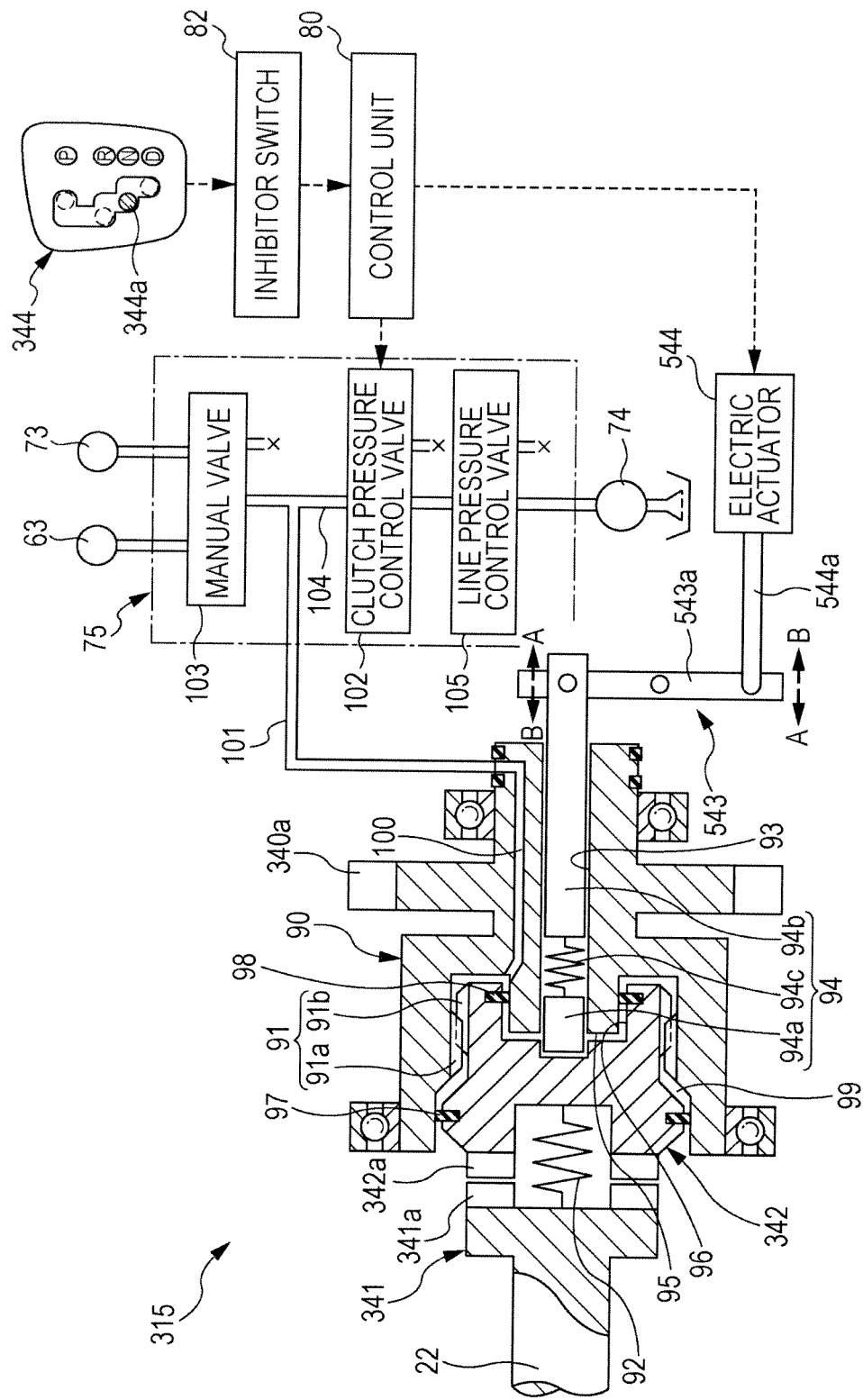
FIG. 20 is a schematic view showing a structure and control system of a dog clutch of a drive device for a vehicle according to the fifth embodiment of the present invention.

FIG. 20 is a schematic view showing the structure and control system of a dog clutch 315 according to the fifth embodiment of the present invention. The fifth embodiment is a modification of the third embodiment. For this, a schematic view showing a drive device for a vehicle according to the fifth embodiment and a schematic view showing part of a drive device for a vehicle together with a control system are the same as those of the third embodiment and are omitted. The reference numerals and symbols to be described below refer to the same components as those with the same reference numerals and symbols in the third embodiment, and a dog clutch 315 having a structure different from that of the third embodiment is described below.

As shown in FIG. 20, the dog clutch 315 is provided with a drive mating member 341 connected to a turbine shaft 22 and a clutch drum (drum member) 90 fixed to the drive gear 340a. The clutch drum 90 has spline teeth 91a formed in an inner surface thereof, while a driven mating member 342 housed in the clutch drum 90 has spline teeth 91b formed in a peripheral surface thereof so as to be engaged with the spline teeth 91a. In other words, the spline teeth 91a and 91b which are engaged with one another constitute a spline connection 91 through which the clutch drum 90 is coupled to the peripheral portion of the driven mating member 342. As described above, the driven mating member 342 is axially slidably housed in the clutch drum 90, in which the driven mating member 342 moves between a forward position at which the driven mating member 342 is engaged with the drive mating member 341 and a rearward position at which the driven mating member 342 is disengaged from the drive mating member 341. A return spring 92 for biasing the driven mating member 342 toward the rearward position is provided between the drive mating member 341 and the driven mating member 342.

A clutch rod (rod member) 94 is slidably inserted into a through-hole 93 formed in the center of the clutch drum 90 in order to cause the driven mating member 342 of the dog clutch 315 to move between the forward position and the rearward position. The clutch rod 94 has a distal end member 94a and a base member 94b, and a spring 94c that is an elastic member is incorporated in a gap between the distal end member 94a and the base member 94b. In order to cause the clutch rod 94 to move axially, the clutch rod 94 and the electric actuator 544 are connected to each other via a link mechanism 543. The link mechanism 543 includes a swingable link lever 543a. One end of the link lever 543a is connected to a drive rod 544a of the electric actuator 544, while the other end of the link lever 543a is connected to the base member 94b. Shifting the select lever 344a to the N or P range allows the non-energized electric actuator 544 to push out the drive rod 544a in a direction indicated by an arrow A, which causes the clutch rod 94 to be pulled out from the clutch drum 90. On the other hand, shifting the select lever 344a to the D or R range allows the energized electric actuator 544 to pull in the drive rod 544a in a direction indicated by an arrow B, which causes the clutch rod 94 to be pushed into the clutch drum 90.

As shown in FIG. 20, the clutch drum 90 has an annular convex portion 95 formed in the center thereof, and the driven mating member 342 housed in the clutch drum 90 has a circular concave portion 96 formed therein which corresponds to the annular convex portion 95. The driven mating member 342 has an oil seal 97 provided on the outer circumferential surface thereof, and the circular concave portion 96 of the driven mating member 342 has an oil seal 98 installed on the inner surface thereof. Installation of the pair of oil seals 97 and 98 in the driven mating member 342 as described above causes an engagement oil chamber 99 to be defined by the oil seals 97 and 98 between the clutch drum 90 and the driven mating member 342. The clutch drum 90 also has an clutch oil passage 100 formed so as to be opened to the engagement oil chamber 99, and a branch oil passage 101 extending from the valve unit 75 is connected to the clutch oil passage 100. The branch oil passage 101 connected to the clutch oil passage 100 is branched from an oil passage 104 connecting a clutch pressure control valve 102 and a manual valve 103 in the valve unit 75. In addition, as shown in FIG. 20, the oil seal 97 is provided at one end of the spline connection 91, while the oil seal 98 is provided in the other end of the spline connection 91. This arrangement causes the spline connection 91 to be disposed in the engagement oil chamber 99 defined in the back side of the driven mating member 342.

The valve unit 75 has a line pressure control valve 105, the clutch pressure control valve 102, the manual valve 103, and the like incorporated therein. Hydraulic oil discharged from the oil pump 74 is subjected to pressure regulation so as to have a basic pressure through the line pressure control valve 105, and further subjected to pressure regulation through the clutch pressure control valve 102 in accordance with the operating status of the forward clutch 49 and the rearward brake 50. The hydraulic oil subjected to pressure regulation through the clutch pressure control valve 102 is distributed to the engagement oil chamber 63 of the forward clutch 49 and the engagement oil chamber 73 of the rearward brake 50 through the manual valve 103 which is switched in conjunction with the select lever 344a. The clutch pressure control valve 102 is controlled by the control unit 80. When the D range is selected, the hydraulic oil for engaging the forward clutch 49 is subjected to pressure regulation through the clutch pressure control valve 102. In contrast, when the R range is selected, the hydraulic oil for engaging the rearward brake 50 is subjected to pressure regulation through the clutch pressure control valve 102. In other words, when either one of the D range and the R range which engage the forward clutch 49 and the rearward brake 50 respectively is selected, hydraulic oil is delivered to an oil passage 104 connecting the clutch pressure control valve 102 and the manual valve 103. On the other hand, when either one of the P range and the N range which disengage the forward clutch 49 and the rearward clutch 50 respectively is selected, hydraulic oil is discharged from the oil passage 104 connecting the clutch pressure control valve 102 and the manual valve 103. Accordingly, when the D or R range is selected, hydraulic oil is delivered to the engagement oil chamber 99 through the branch oil passage 101 and the clutch oil passage 100. In contrast, when the P or N range is selected, hydraulic oil in the engagement oil chamber 99 is discharged from the clutch pressure control valve 102 through the clutch oil passage 100 and the branch oil passage 101.

Figure 21:
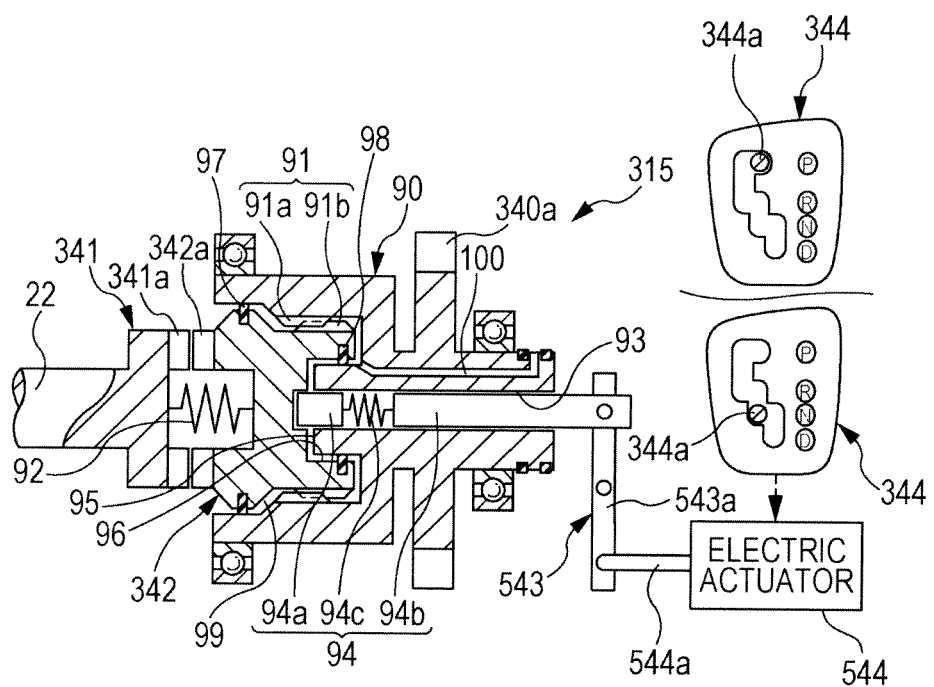
FIG. 21 is an explanatory diagram showing an operation status of the dog clutch.

Next, the operation status of the dog clutch 315 that is switched to an engaged state or a disengaged state via the shift operation is described below. FIGS. 21 through 22B are explanatory diagrams showing the operation status of the dog clutch 315. A white arrow placed in FIG. 22B indicates a path through which power is transmitted. As shown in FIG. 21, when the N or P range is selected via the shift operation, the non-energized electric actuator 544 pushes out the drive rod 544a, which causes the distal end member 94a of the clutch rod 94 to move away from the driven mating member 342. Due to the selection of the N or P range which disengages the forward clutch 49 and the rearward brake 50, hydraulic oil is discharged from the engagement oil chamber 99 of the dog clutch 315. As described above, when the N or P range is selected via the shift operation, the return spring 92 moves the driven mating member 342 to the rearward position through its spring force, which causes the dog clutch 315 to be switched to the disengaged state.

Figure 22A:
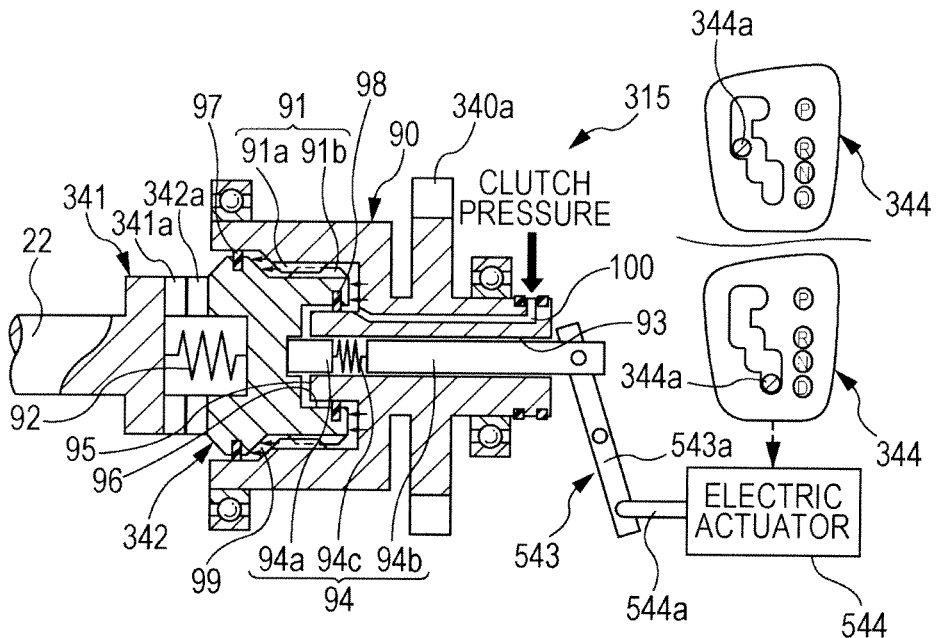
FIGS. 22A and 22B are explanatory diagrams showing an operation status of the dog clutch.
Figure 22B:
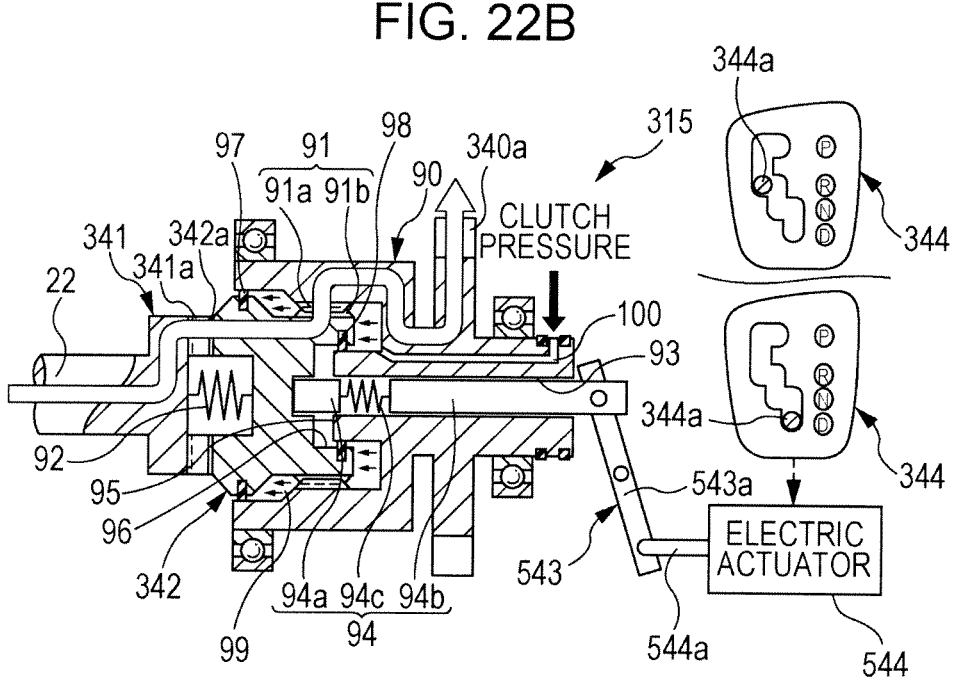

Next, as shown in FIG. 22A, when the D or R range is selected via the shift operation, the energized electric actuator 544 pulls in the drive rod 544a, which causes the distal end member 94a of the clutch rod 94 to come into contact with the driven mating member 342 while the distal end member 94a is pressed against the spring 94c. As shown in FIG. 22B, when the drive mating member 341 and the driven mating member 342 rotate in relation to each other to cause the mating teeth 341a and 342a facing one another to be mated with one another, the spring 94c pushes the driven mating member 342 to the forward position through its spring force, causing the dog clutch 315 to be switched to the engaged state. As described above, incorporating the spring 94c in the clutch rod 94 allows the electric actuator 544 to pull in the drive rod 544a before the engagement of the dog clutch 315. In other words, the incorporation of the spring 94c allows the distal end member 94a to be pressed against the driven mating member 342 while the distal end member 94a follows the driven mating member 342, thereby enabling the dog clutch 315 to be brought into an engagement wait state. This arrangement allows the dog clutch 315 to be switched to the engaged state without imposing an excessive load on the electric actuator 544.

In addition, as shown in FIGS. 22A and 22B, when the D or R range is selected, hydraulic oil is delivered to the engagement oil chamber 99 of the dog clutch 315 through the clutch pressure control valve 102. In other words, hydraulic pressure can assist in pushing the driven mating member 342, which reduces effort needed for the electric actuator 544, thereby allowing downsizing of the electric actuator 544. Since hydraulic pressure can assist in pushing the driven mating member 342, the hydraulic pressure can be used to switch the dog clutch 315 to the engaged state and thereby enable the vehicle to run, even if the inhibitor switch 82 or the electric actuator 544 or the like enters a fail state. Furthermore, even after the dog clutch 315 is switched to the engaged state, the hydraulic pressure keeps the driven mating member 342 at the forward position, which prevents the dog clutch 315 from being disengaged, thereby enhancing the reliability of the dog clutch 315. In addition, since the spline connection 91 is located in the engagement oil chamber 99 of the dog clutch 315, the spline connection 91 can be lubricated with the hydraulic oil in the engagement oil chamber 99.

Figure 23:
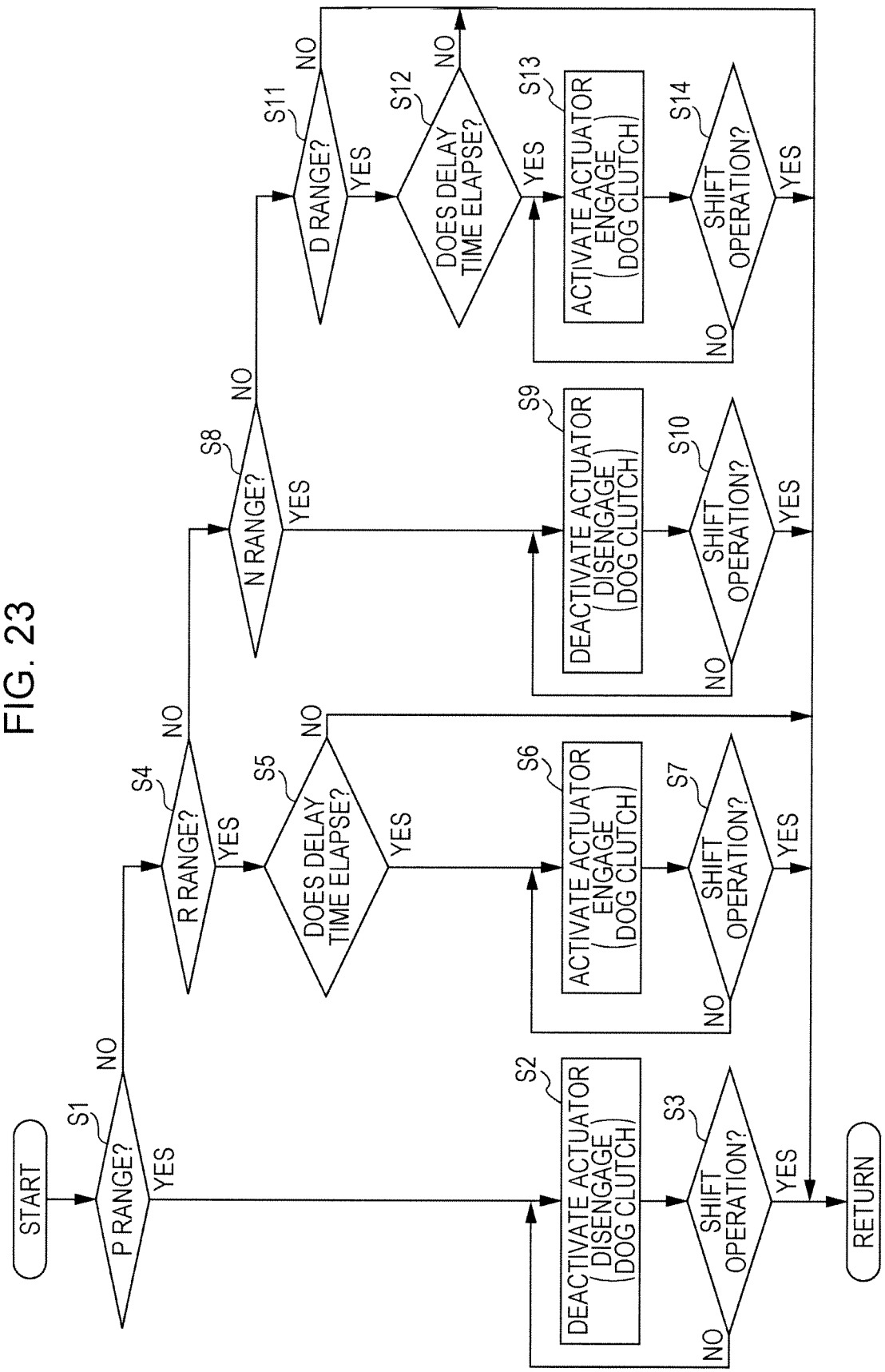
FIG. 23 is a flowchart for explaining steps that are performed for dog clutch engagement/disengagement control.

In order to avoid an unnecessary engagement of the dog clutch 315, the control unit 80 drives the electric actuator 544 for engagement of the dog clutch 315 after the selection of the D or R range followed by the elapse of a predetermined delay time. FIG. 23 is a flowchart for explaining steps performed for engagement/disengagement control of the dog clutch 315. As shown in FIG. 23, a determination is made in step S1 as to whether or not the P range is selected. If it is determined in step S1 that the P range is selected, the flow proceeds to step S2 where the electric actuator 544 is de-energized for disengagement of the dog clutch 315. The dog clutch 315 remains disengaged until it is determined in step S3 that a new shift operation is made.

If it is determined in step S1 that the P range is not selected, the flow proceeds to step S4 where a determination is made as to whether or not the R range is selected. If it is determined in step S4 that the R range is selected, the flow proceeds to step S5 where a determination is made as to whether the R range is retained until a predetermined delay time elapses. If it is determined in step S5 that the R range is retained over the delay time, the flow proceeds to step S6 where the electric actuator 544 is energized for engagement of the dog clutch 315. The dog clutch 315 remains engaged until it is determined in step S7 that a new shift operation is made. On the other hand, if it is determined in step S5 that the R range is disengaged within the delay time, the flow exits the routine without engaging the dog clutch 315.

If it is determined in step S4 that the R range is not selected, the flow proceeds to step S8 where a determination is made as to whether or not the N range is selected. If it is determined in step S8 that the N range is selected, the flow proceeds to step S9 where the electric actuator 544 is de-energized for disengagement of the dog clutch 315. The dog clutch 315 remains disengaged until it is determined in step S10 that a new shift operation is made.

If it is determined in step S8 that the N range is not selected, the flow proceeds to step S11 where a determination is made as to whether or not the D range is selected. If it is determined in step S11 that the D range is selected, the flow proceeds to step S12 where a determination is made as to whether the D range is retained until a predetermined delay time elapses. If it is determined in step S12 that the D range is retained over the delay time, the flow proceeds to step S13 where the electric actuator 544 is energized for engagement of the dog clutch 315. The dog clutch 315 remains engaged until it is determined in step S14 that a new shift operation is made. On the other hand, if it is determined in step S12 that the D range is disengaged within the delay time, the flow exits the routine without engaging the dog clutch 315.

As described above, when the D or R range is selected, the electric actuator 544 is driven for engagement of the dog clutch 315 after a predetermined delay time elapses. Doing this prevents the dog clutch 315 from being erroneously engaged even if the select lever 344a passes through the D or R range during the shift operation, thereby avoiding an unnecessary engagement of the dog clutch 315 and reducing an engagement shock. When the P or N range is selected, the dog clutch 315 is switched to the disengaged state by de-energizing the electric actuator 544. In other words, the electric actuator 544 disengages the dog clutch 315 when de-energized. For this, even if the ignition switch 86 is turned off, the electric actuator 544 disengages the dog clutch 315 and creates the neutral state, thereby enabling vehicle towing or other work to be safely done.

Although the input clutches (dog clutches) 15, 215 and 315 are disposed at the side of the engine 11, not at the side of the forward clutch 48, the input clutches (dog clutches) 15, 215 and 315 may be disposed at the side of the drive wheels 19f and 19r, not at the side of the forward clutch 48. In addition, although the input clutches (dog clutches) 15, 215 and 315 are disposed at the side of the engine 11, not at the side of the continuously variable transmission 13, the input clutches (dog clutches) 15, 215 and 315 may be disposed at the side of the drive wheels 19f and 19r, not at the side of the continuously variable transmission 13. It is only necessary to dispose the forward clutch 48 and the input clutch (dog clutch) 15, 215 and 315 in the power transmission path 18 between the engine 11 and the drive wheels 19f and 19r, irrespective of their positional relationship with other mechanisms. If an engine start via an ignition switch operation is taken into consideration, the input clutches (dog clutches) 15, 215 and 315 are preferably disposed closer to the engine 11 in order to separate rotating bodies from the engine 11 for enhanced easiness of engine start. In particular, if the continuously variable transmission 13 is used as a transmission mechanism, the input clutches (dog clutches) 15, 215 and 315 are preferably disposed at the side of the engine 11, not at the side of the continuously variable transmission 13, in order to prevent the continuously variable transmission 13 having a significantly reduced oil pressure from being rotated during the engine start-up via the ignition switch operation.

Although the spring 65 is mounted in the forward clutch 48 of the forward/backward switching mechanism 14 in the above description, a spring for biasing the hydraulic piston 72 toward the engagement direction may be installed in the rearward brake (friction engagement mechanism) 49 of the forward/backward switching mechanism 14. This arrangement can also prevent the rearward brake 49 from producing an engagement shock at the time of an engine restart. The spring 65 for biasing the hydraulic pistons 62 and 72 toward the engagement direction may be installed in both the forward clutch 48 and the rearward brake 49.

Although the chain drive type continuously variable transmission 13 is mounted as the transmission mechanism in the drive devices for a vehicle 10, 210 and 310 in the above description, the present invention is not limited to this. Examples of the transmission mechanism include a belt drive type or traction drive type continuously variable transmission, and a planetary gear type or parallel axis type transmission. If an automatic transmission is used as the transmission mechanism, a spring for biasing a hydraulic piston toward the engagement direction is mounted in a friction clutch (friction engagement mechanism) or friction brake (friction engagement mechanism) that are engaged during forward driving or rearward driving.

The present invention is typically described with reference to, but not limited to, the foregoing preferred embodiments. Various modifications are conceivable within the scope of the present invention. For example, although a select lever is used as a manual shift control in the above description, a paddle type manual shift control for making the shift operation using a paddle, a dial type manual shift control for making the shift operation using a dial, or a push button type manual shift control for making the shift operation using a push button may be used. Although a trochoid pump is used as the oil pump 74, other types of pump such as an internal and an external gear pump may be used. Although the drive devices for a vehicle 10, 210 and 310 shown in the figures are designed for four-wheel-drive vehicles, those designed for front-wheel-drive or rear-wheel-drive vehicles may be used. Needless to say, the drive devices for a vehicle 10, 210 and 310 according to the present invention may be applied to hybrid vehicles provided with an internal combustion engine and an electric motor as power sources.

What is claimed is:

1. A drive device for a vehicle provided with an engine that is automatically shut down under a predetermined shutdown condition and is automatically restarted under a predetermined restart condition, the drive device comprising:

a friction engagement mechanism that is provided in a power transmission path between the engine and a drive wheel and moves a hydraulic piston in an engagement direction to bring a friction plate into an engaged state and moves the hydraulic piston in a disengagement direction to cancel the engaged state of the friction plate;

an oil pump that is driven by the engine and delivers hydraulic oil to the friction engagement mechanism for moving the hydraulic piston in the engagement direction or the disengagement direction; and an input clutch that is provided in the power transmission path and is switched to a disengaged state that disconnects the power transmission path or to an engaged state that connects the power transmission path on the basis of a shift operation performed by a driver, wherein a biasing unit for biasing the hydraulic piston toward an engagement direction is provided in the friction engagement mechanism to hold the friction engagement mechanism in a slipping state or an engaged state during an engine shutdown that causes the oil pump to be deactivated, and wherein the input clutch is switched to a disengaged state when a neutral position is selected, thereby disconnecting the engine from the drive wheel even during an engine shutdown that causes the friction engagement mechanism to be put into a slipping state or an engaged state.

2. The drive device according to claim 1, wherein the input clutch comprises a dog clutch.

3. The drive device according to claim 2, further comprising:
a manual shift control that is shifted to a drive range when power is transmitted to a drive wheel and is shifted to a non-drive range when transmission of power to the drive wheel is cancelled,
wherein the dog clutch is connected to the manual shift control, and the engine and the drive wheel are separated from each other when the non-drive range is selected by the driver during the engine shutdown which causes the friction engagement mechanism to be put into the slipping state or the engaged state.

4. The drive device according to claim 3,
wherein the dog clutch has a drive mating member and a driven mating member that faces the drive mating member, and has a rod member that pushes the driven mating member into the drive mating member in conjunction with the manual shift control, and
wherein the rod member has a distal end member and a proximal end member that is disposed coaxially with the distal end member with a buffering member therebetween.

5. The drive device according to claim 4, wherein the rod member is pushed to a position at which the rod member comes into contact with the driven mating member when a forward drive range is selected.

6. The drive device according to claim 5, wherein the dog clutch has the drive mating member and the driven mating member that faces the drive mating member, and an engagement oil chamber that urges the driven mating member toward the drive mating member is defined at a back side of the driven mating member.

7. The drive device according to claim 6, wherein hydraulic oil is delivered to the engagement oil chamber when a rearward drive is selected.

8. The drive device according to claim 7, wherein hydraulic oil is delivered to the engagement oil chamber when the forward drive range is selected.

9. The drive device according to claim 8,
wherein the dog clutch has a drum member that is connected to a peripheral portion of the driven mating member with a spline connection therebetween,
wherein a pair of oil seals are provided at a first end of the spline connection and a second end of the spline connection between the driven mating member and the drum member, and
wherein the engagement oil chamber is defined by the oil seals between the driven mating member and the drum member.

10. The drive device according to claim 3, further comprising a cam mechanism that is provided between the manual shift control and the dog clutch, and switches the dog clutch to a disengaged state when the manual shift control is shifted to the non-drive range and switches the dog clutch to an engaged state when the manual shift control is shifted to the drive range.

11. The drive device according to claim 10, wherein the cam mechanism has a cam that is rotated in conjunction with the manual shift control, and the cam has a plurality of projections on a profile of the cam.

12. The drive device according to claim 11,
wherein the dog clutch has a drive mating member and a driven mating member that faces the drive mating member, and has a rod member that pushes the driven mating member into the drive mating member, and
wherein the rod member is pushed by one of the projections when the manual shift control is shifted to a forward drive range and the rod member is pushed by the other of the projections when the manual shift control is shifted to a rearward drive range.

13. The drive device according to claim 12, wherein the rod member has a distal end member and a proximal end member that is disposed coaxially with the distal end member with a buffering member therebetween.

14. The drive device according to claim 13, wherein the dog clutch has the drive mating member and the driven mating member that faces the drive mating member, and the engagement oil chamber that urges the driven mating member toward the drive mating member is defined at a back side of the driven mating member.

15. The drive device according to claim 14, wherein hydraulic oil is delivered to the engagement oil chamber when the manual shift control is shifted to the forward drive range or the rearward drive range.

16. The drive device according to claim 15,
wherein the dog clutch has a drum member that is connected to a peripheral portion of the driven mating member with a spline connection therebetween,
wherein a pair of oil seals is provided at a first end of the spline connection and a second end of the spline connection between the driven mating member and the drum member, and
wherein the engagement oil chamber is defined by the oil seals between the driven mating member and the drum member.

17. The drive device according to claim 16, further comprising:
an actuator connected to the cam mechanism,
wherein switching of the dog clutch to the engaged state is assisted by the actuator.

18. The drive device according to claim 3, further comprising an electric actuator that is connected to the dog clutch, and switches the dog clutch to a disengaged state when the manual shift control is shifted to the non-drive range and switches the dog clutch to the engaged state when the manual shift control is shifted to the a drive range.

19. The drive device according to claim 18,
wherein the dog clutch has a drive mating member and a driven mating member that faces to the drive mating member, and has a rod member that is connected to the electric actuator and pushes the driven mating member into the drive mating member, and
wherein the rod member has a distal end member and a proximal end member that is disposed coaxially with the distal end member with a buffering member therebetween.

20. The drive device according to claim 19, wherein the electric actuator pushes the rod member to a position at which the rod member comes into contact with the driven mating member when the drive range is selected.

21. The drive device according to claim 20, wherein the electric actuator switches the dog clutch to a disengaged state when not energized.

22. The drive device according to claim 21, wherein the dog clutch has the drive mating member and the driven mating member that faces the drive mating member, and an engagement oil chamber that urges the driven mating member toward the drive mating member is defined at a back side of the driven mating member.

23. The drive device according to claim 22, wherein hydraulic oil is delivered to the engagement oil chamber when the drive range is selected.

24. The drive device according to claim 23, wherein the dog clutch has a drum member that is connected to a peripheral portion of the driven mating member with a spline connection therebetween, wherein a pair of oil seals is provided at a first end of the spline connection and a second end of the spline connection between the driven mating member and the drum member, and wherein the engagement oil chamber is defined by the oil seals between the driven mating member and the drum member.

25. The drive device according to claim 1, further comprising:
an input clutch mechanism that is disposed in the power transmission path and has an electromagnetic drive, and is switched to an engaged state in which the power transmission path is connected when the electromagnetic drive is energized and is switched to a disengaged state in which the power transmission path is disconnected when the electromagnetic drive is de-energized; and
an input clutch control unit that puts the electromagnetic drive into an energized state or a non-energized state on the basis of the shift operation performed by the driver,
wherein, if the neutral position is selected when the vehicle is in an activated
state in which an activation switch is activated, the input clutch control means puts the electromagnetic drive into a de-energized state, thereby switching the input clutch mechanism to a disengaged state, and
wherein, if the vehicle is in a deactivated state in which the activation switch is deactivated, a deactivation of the activation switch causes the electromagnetic drive to be put into the de-energized state, thereby switching the input clutch mechanism to the disengaged state.

* * * * *